(12) United States Patent
Mondiot

(10) Patent No.: US 12,001,111 B2
(45) Date of Patent: Jun. 4, 2024

(54) ELECTRICALLY CONTROLLABLE DEVICE HAVING VARIABLE DIFFUSION BY LIQUID CRYSTALS, AND METHOD FOR SAME

(71) Applicant: SAINT-GOBAIN GLASS FRANCE, Courbevoie (FR)

(72) Inventor: Frédéric Mondiot, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/916,449

(22) PCT Filed: Mar. 26, 2021

(86) PCT No.: PCT/FR2021/050530
§ 371 (c)(1),
(2) Date: Sep. 30, 2022

(87) PCT Pub. No.: WO2021/198596
PCT Pub. Date: Oct. 7, 2021

(65) Prior Publication Data
US 2023/0152649 A1 May 18, 2023

(30) Foreign Application Priority Data

Apr. 1, 2020 (FR) ..................................... 2003244

(51) Int. Cl.
*G02F 1/137* (2006.01)
*G02F 1/1334* (2006.01)
(Continued)

(52) U.S. Cl.
CPC ...... *G02F 1/13756* (2021.01); *G02F 1/13345* (2021.01); *G02F 1/134309* (2013.01);
(Continued)

(58) Field of Classification Search
None
See application file for complete search history.

(56) References Cited

U.S. PATENT DOCUMENTS 5,437,811 A * 8/1995 Doane ............... G02F 1/1334
349/86
5,691,795 A * 11/1997 Doane ............... C09K 19/586
349/169
(Continued)

FOREIGN PATENT DOCUMENTS

DE 102 57 711 A1 7/2003
EP 0 844 075 A1 5/1998
(Continued)

OTHER PUBLICATIONS

International Search Report as issued in International Patent Application No. PCT/FR2021/050530, dated May 14, 2021.
(Continued)

*Primary Examiner* — Ryan Crockett
(74) *Attorney, Agent, or Firm* — Pillsbury Winthrop Shaw Pittman LLP

(57) ABSTRACT

A device having variable scattering by liquid crystals includes a stack with a first electrode, an electroactive layer with liquid crystals being stabilized by the polymeric network, and a second electrode. The material exhibits, from a temperature referred to as T1, a mesophase referred to as P. At a temperature T' greater than or equal to T1, the stack is capable of exhibiting at least three stable and reversible scattering states in the visible range and a variable color.

20 Claims, 25 Drawing Sheets

(51) Int. Cl.
  *G02F 1/1335* (2006.01)
  *G02F 1/1343* (2006.01)
(52) U.S. Cl.
  CPC .... *G02F 1/13775* (2021.01); *G02F 1/133531* (2021.01); *G02F 2202/04* (2013.01)

(56) References Cited

U.S. PATENT DOCUMENTS

| | | | |
|---|---|---|---|
| 6,674,504 B1 * | 1/2004 | Li | G02F 1/13476 349/169 |
| 2004/0253439 A1 | 12/2004 | Martin et al. | |
| 2013/0141656 A1 * | 6/2013 | Kujawa | B32B 17/10504 264/1.24 |
| 2015/0029211 A1 * | 1/2015 | Weber | G02F 1/1334 345/592 |
| 2015/0146286 A1 | 5/2015 | Hagen et al. | |

FOREIGN PATENT DOCUMENTS

| | | | | |
|---|---|---|---|---|
| EP | 1 653 275 A1 | 5/2006 | | |
| FR | 3086771 A1 * | 4/2020 | ........... | G02F 1/1334 |
| GB | 217907 A | 11/1924 | | |
| GB | 308987 A | 5/1930 | | |
| GB | 308990 A | 8/1930 | | |
| GB | 308984 A | 10/1930 | | |
| WO | WO 2004/025334 A2 | 3/2004 | | |
| WO | WO 2010/070606 A1 | 6/2010 | | |
| WO | WO 2011/161391 A1 | 12/2011 | | |

OTHER PUBLICATIONS

Zappone, B., et al., "Periodic lattices of frustrated focal conic defect domains in smectic liquid crystal films," Soft Matter, vol. 8, No. 16, Jan. 2012, XP055733718, pp. 4318-4326.
Gim, M.-J., et al., "Morphogenesis of liquid crystal topological defects during the nematic-smectic A phase transition," Nature Communication, vol. 8, No. 1, May 2017, XP055733731, pp. 1-9.
Gppdby, J. W., et al., "What makes a liquid crystal? The effect of free volume on soft matter," Liquid Crystals, Jun. 2015, 32, pages.
Blinov, L. M., et al., "Electrooptic effect in Liquid Crystal Materials," in particular: chapter 2.3 entitled "Optical Anisotropy and Dichroism" and pp. 66 to 68, including table 2.2, (Year: 1994), 8 pages.
Sims, M. T., "Dyes as guests in ordered systems: current understanding and future directions," Liquid Crystals, (Year: 2016), vol. 43, Nos. 13-15, pp. 2363-2374.

* cited by examiner

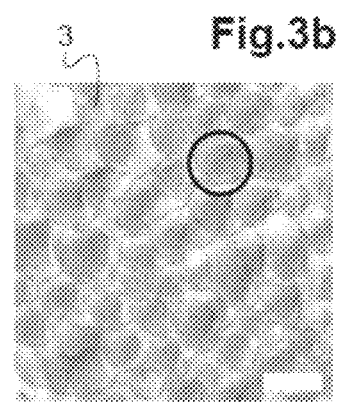
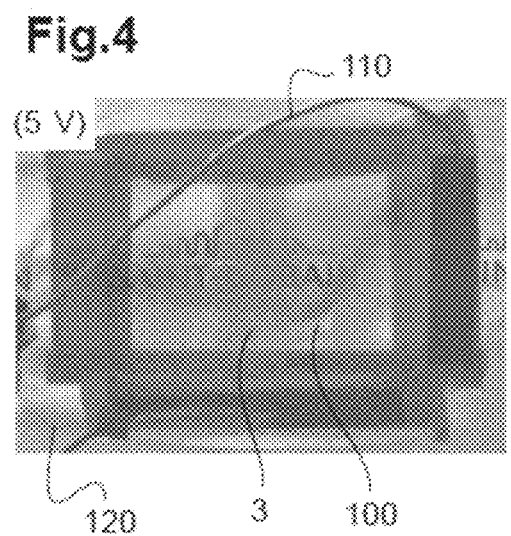

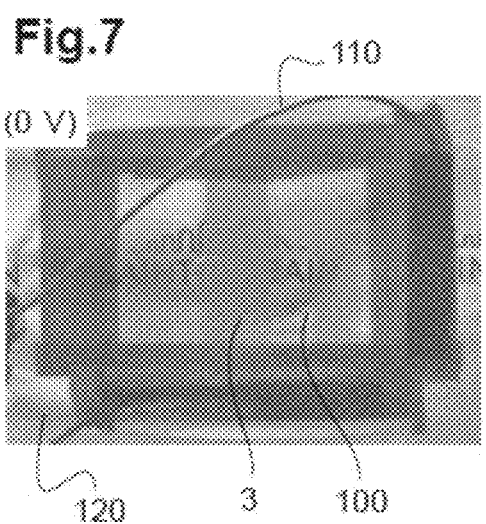

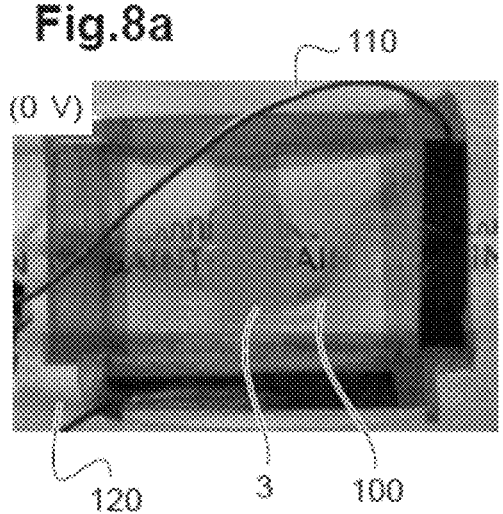
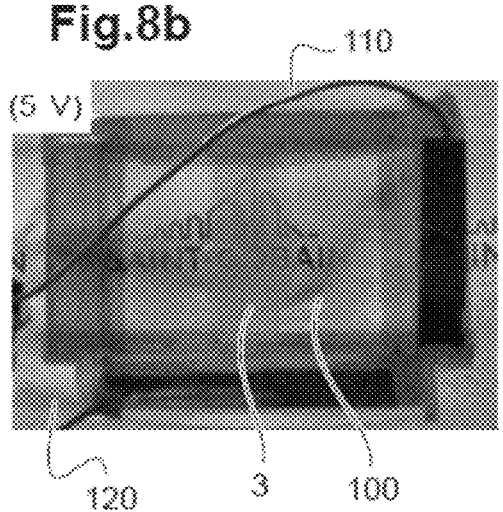

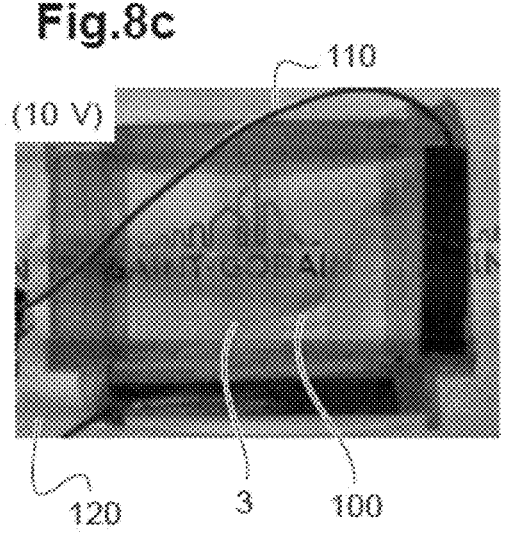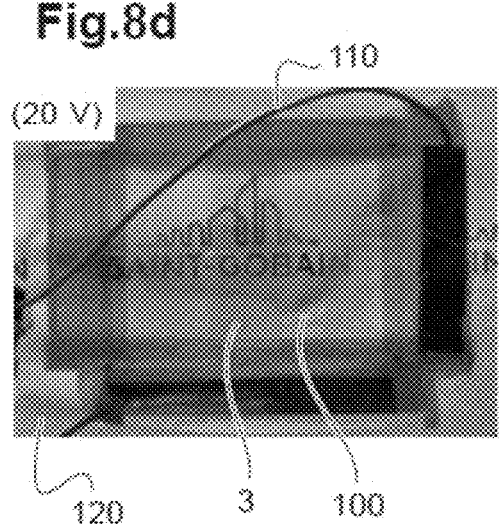

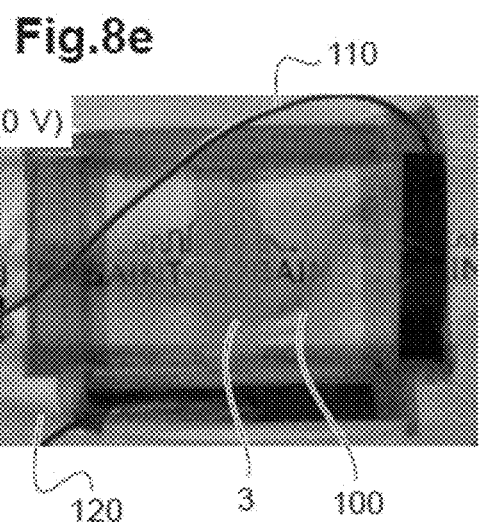

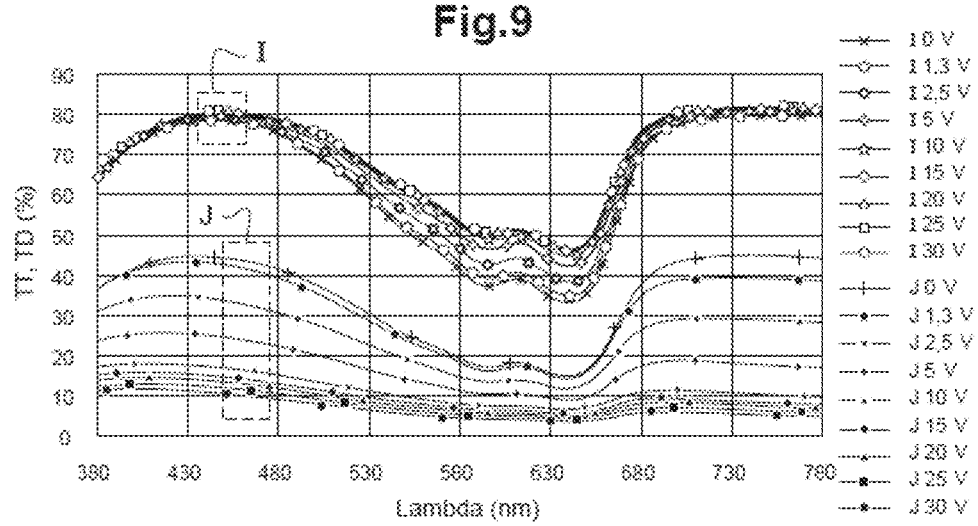
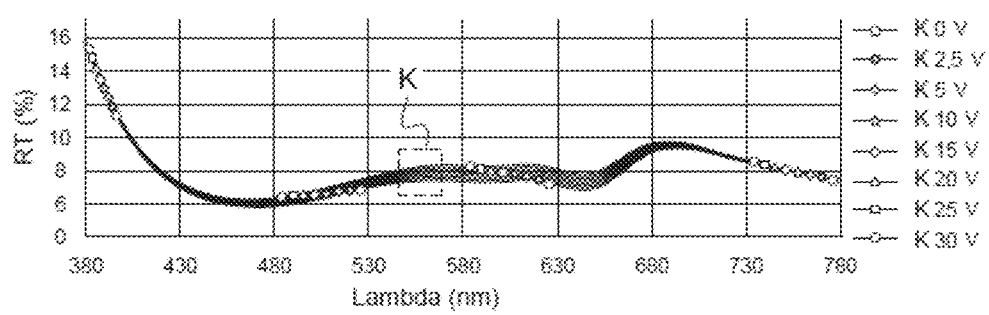
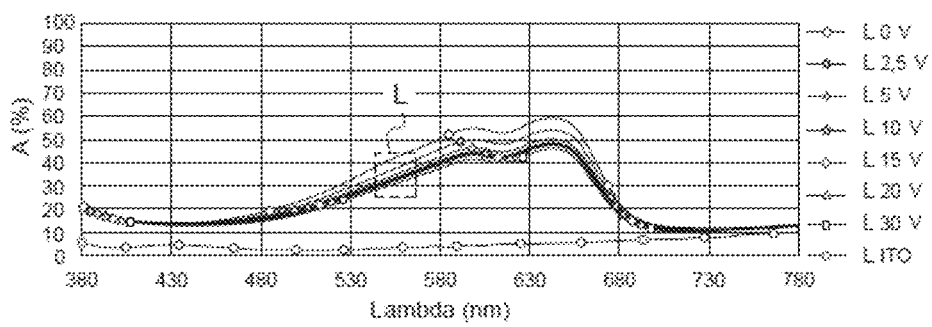

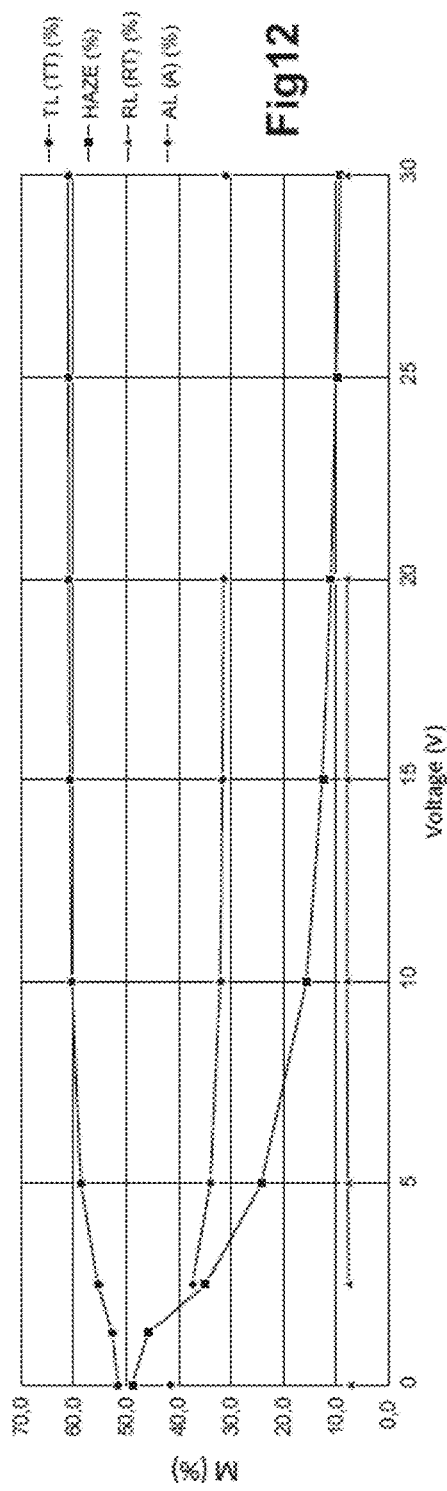

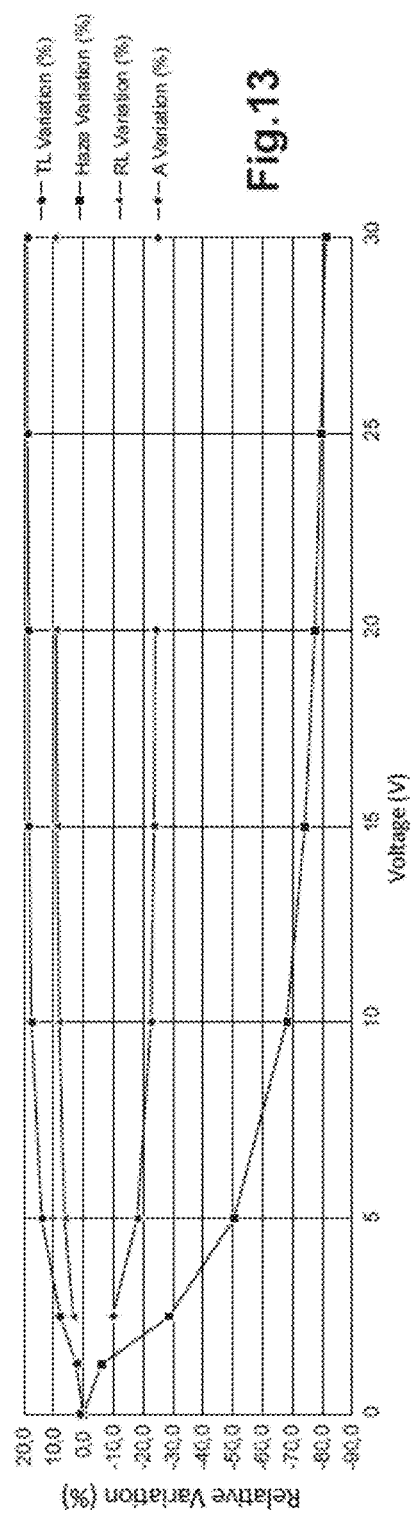

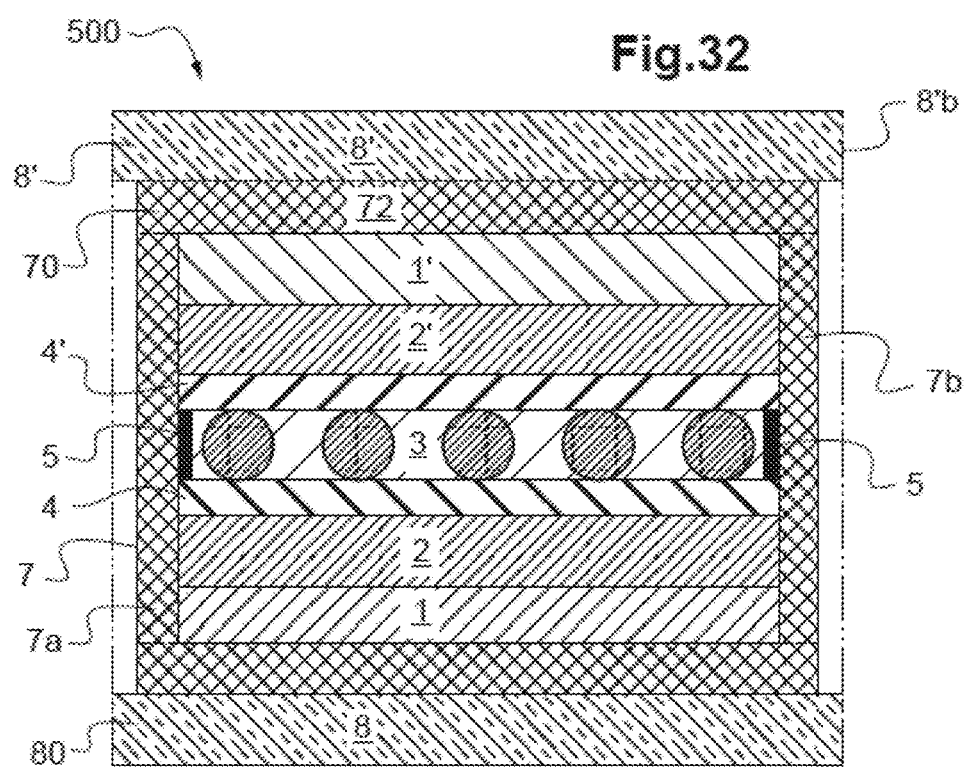

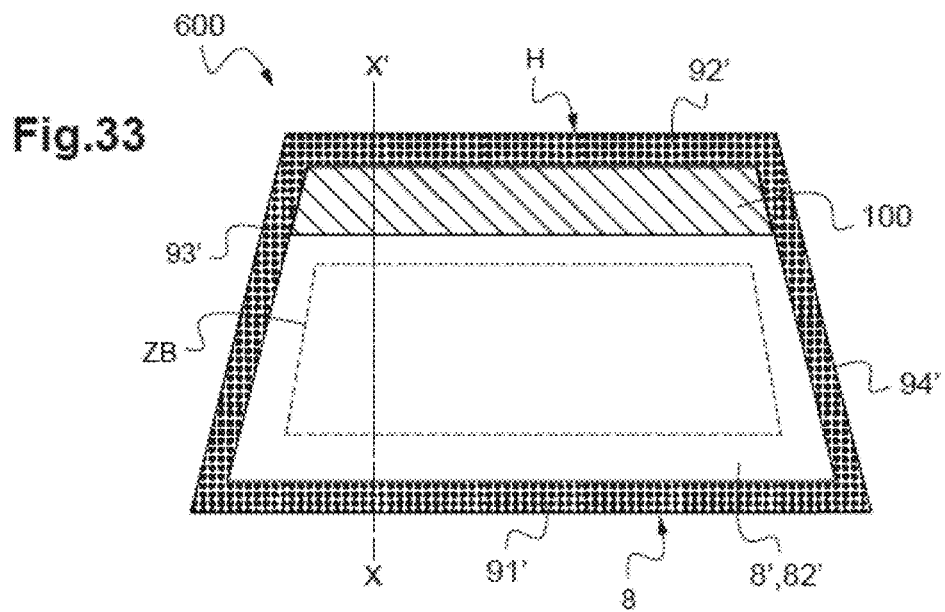
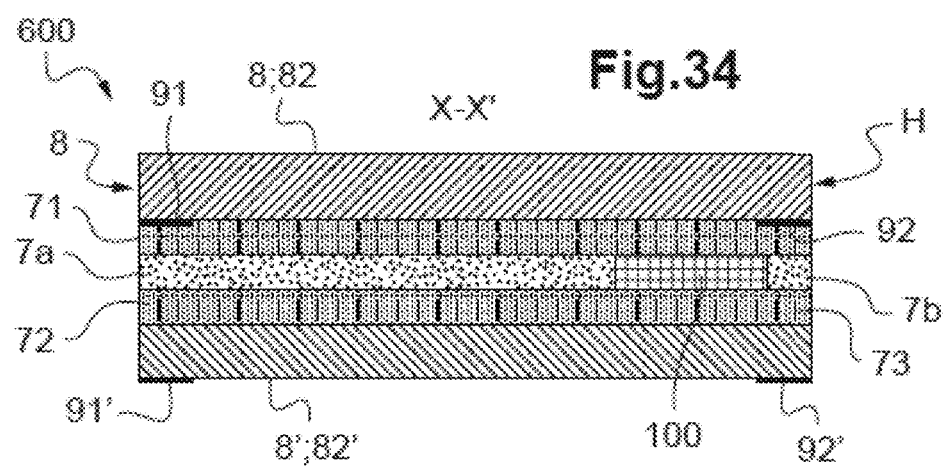

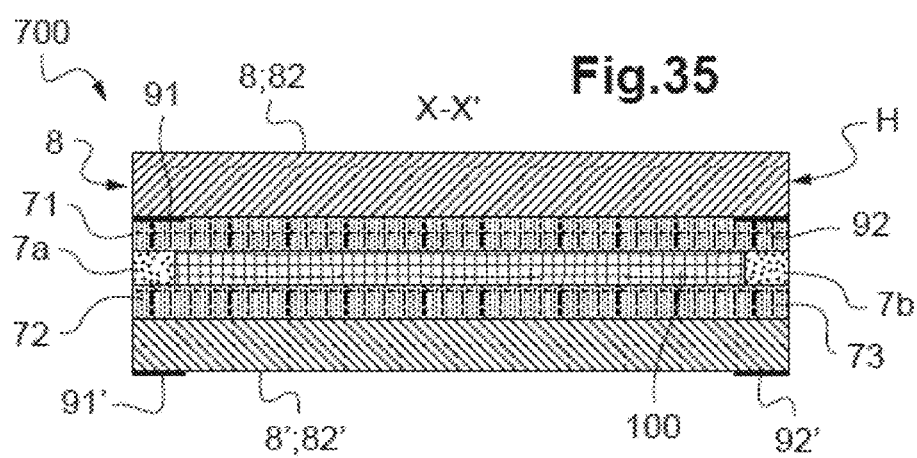

ELECTRICALLY CONTROLLABLE DEVICE HAVING VARIABLE DIFFUSION BY LIQUID CRYSTALS, AND METHOD FOR SAME

CROSS-REFERENCE TO RELATED APPLICATIONS

This application is the U.S. National Stage of PCT/FR2021/050530, filed Mar. 26, 2021, which in turn claims priority to French patent application number 2003244 filed Apr. 1, 2020. The content of these applications are incorporated herein by reference in their entireties.

The invention relates to an electrically controllable device having variable scattering by liquid crystals, provided with a layer of liquid crystals between two electrodes, by application of an electric field.

Glazings are known, certain features of which can be modified under the effect of a suitable supply of power, most particularly transmission, absorption, reflection at certain wavelengths of electromagnetic radiation, in particular in the visible and/or infrared range, or else light scattering.

The electrically controllable glazing having liquid crystals can be used anywhere, both in the construction sector and in the automotive sector, whenever a view through the glazing needs to be prevented at given times.

Liquid crystal systems are known under the terms "PDLC" (Polymer Dispersed Liquid Crystal), in the form of droplets of liquid crystals dispersed in a polymer matrix, or else "PSLC" (Polymer Stabilized Liquid Crystal), liquid crystals distributed homogeneously.

One object of the invention consists of developing an electrically controllable device having liquid crystals of PSLC type with improved electro-optical properties, in particular which are adjustable in a tailored manner.

To this end, the present invention first proposes an electrically controllable device having variable scattering (planar or curved device, in particular flexible) by liquid crystals, comprising a stack of layers (optionally including an air gap) in this order:
- a first electrode, preferably transparent and in particular self-supporting (optionally a flexible film) or preferably on a dielectric substrate, preferably transparent (and optionally flexible), in particular of a thickness of at most 1 cm, 5 mm, 3 mm or sub-millimeter, or in particular a plastic film or thin glass or utlrathin glass ("UTG"), which film is of sub-millimetric thickness and even of at most 200 nm, which first electrode comprises (or even consists of) a first electrically conductive layer (single layer or multilayer, in particular deposit(s)), in particular mineral, in particular of a thickness of at most 200 nm (on the first substrate), which first electrode with a first main surface referred to as first connecting surface and a surface referred to as opposite surface Sb, in particular which first electrode comprising a first current-supplying means (busbar strip—in particular metal, made of copper, silver, etc.) at the edge of the first connecting surface
- a dielectric electroactive layer with a main face referred to as connecting surface-side face A1 and a main face referred to as opposite face A2, the electroactive layer being of sub-millimetric thickness $E_0$ and even of at most 100 μm and at least 50 nm, in particular from 50 nm to 50 μm and even from 100 nm to 20 μm and better still of at least 1 μm or 5 μm, which electroactive layer is made of a material which is in particular thermotropic (preferably) and/or lyotropic and contains (or even consists of):
  - liquid crystals (in particular preferably thermotropic and/or lyotropic), preferably predominant by weight in the material (preferably at least 50%, 70%, 80%, 85% by weight of said liquid crystals), in particular liquid crystals comprising mesogens, for example without polymer chain or which are groups incorporated in a main chain or side chain of a polymer (family referred to as "LCP"), in particular liquid crystals of a size of at most 50 nm, 20 nm or 10 nm (and less than $E_0$), in particular a mixture of several liquid crystals (pure, in the sense of not being LCP), therefore several mesogens
  - polymers forming a (three-dimensional) polymeric network, the liquid crystals being (physically) stabilized by the polymeric network (i.e. the "PSLC" family), preferably with at most 20%, 15%, 10%, 5% by weight of polymer (or polymers and polymer precursors),
  - optionally precursors of (said) polymers or else non-crosslinked polymers (in particular by adjusting the degree of polymerization),
  - preferably at least one dichroic dye (in particular in the dissolved state, in particular in liquid crystals), for example at most 30%, 20%, 10%, 5% by weight of dichroic dye (one or more dichroic dyes), which dichroic dye is in particular of a size of at most 50 nm, 20 nm or 10 nm (and less than $E_0$); in particular, liquid crystals and dichroic dye are of comparable sizes, for example each of less than 20 or 10 nm,
  - preferably, spacers, in particular of a height (and even of a larger dimension) of less than or equal to E0, at the periphery (dielectric, transparent or not, optionally masked by a frame, for example made of mylar, etc.) and/or dispersed in the electroactive layer (dielectric, transparent, in particular plastic, glass, silica, preferably sub-centimetric, in particular beads)
  - optionally additives (other than the dichroic dye), for example coloring particles such as metal nanoparticles (gold, silver, alloy of both, etc.) or metal oxide nanoparticles (tungsten oxide, tin oxide, etc.) or even any other non-dichroic dye or any other light-absorbing molecule, preferably of a height of less than or equal to $E_0$ (and even of a larger dimension of less than or equal to $E_0$)
- a second electrode, preferably transparent and in particular self-supporting (optionally a flexible film) or preferably on a dielectric support, preferably transparent, in particular of a thickness of at most 1 cm, 5 mm, 3 mm or sub-millimeter, in particular a plastic film or thin glass or utlrathin glass ("UTG"), which film is of sub-millimetric thickness and even of at most 200 nm, which in particular second electrode comprising (or even consists of) a second electrically conductive layer (single layer or multilayer, in particular deposit(s)), particularly mineral, in particular of at most 200 nm (on the support), which second electrode with on face A2 side a main surface referred to as second connecting surface and with an opposite surface Sc and in particular which second electrode comprises a second current-supplying means (busbar strip—in particular metal) at the edge of the second connecting surface and better still opposite the first current-supplying means.

In the transparent state, the electroactive layer is visible by transparency on the first electrode side and/or second electrode side, preferably on both sides. Preferably, the electroactive layer is sealed at the periphery by a dielectric seal which is in particular polymeric (at the edge of the first and second connecting surfaces, in contact with the crystal-based material or separated by a peripheral spacer).

In addition, the material (incorporating the liquid crystals) exhibits a mesophase referred to as P, from a temperature referred to as T1 (and below a temperature referred to as Tf which can be the transition temperature into the isotropic phase), in which in particular the material comprises (by volume, most commonly in the thickness) a set of domains (containing the liquid crystals stabilized by the polymeric network and the dichroic dye(s) and optionally additives), and even is substantially divided into said domains or volume elements,—the domains preferably extending between the first and second electrodes at least over a fraction of the thickness $E_0$. In addition, the domains comprise two-dimensional topological defects, in particular line defects, particularly at least two forms of line defects (for example one elliptical—circle included—the other a straight or curved line, hyperbola, etc.).

Preferably, T1 is at most 50° C., 40° C., 30° C. and better still at least 10° C. or even at least −10° C. or −20° C., and better still in a temperature range of at least 5° C., 10° C., 20° C., 30° C., 40° C.

The material preferably exhibits (at a temperature T less than or equal to a temperature T1) another mesophase P' which is closer to (or even adjacent to) the crystalline phase (P being non-smectic, in particular non-smectic A, in particular nematic).

In particular, first liquid crystals of the material may exhibit the mesophase P and at least second liquid crystals of the material may have a mesophase P1 separate from or similar to the first crystals (including of P or P' type) and even optionally with a transition temperature from a mesophase P1 to another mesophase P2 which is separate from that between P and P'. These second liquid crystals may serve for example to regulate the temperature T1. T1 can also be adjusted by the choice of the polymer, the degree of polymerization, the additives, the dye, and by the % of each of these constituents.

At a temperature T' greater than or equal to T1, with the material being in the mesophase P, the stack (or the device, by virtue of the stack) is liable to exhibit at least three (stable) scattering states which are switchable and reversible (they can be switched between one another, thus one of the three states is switchable to another of the three states in a reversible manner)—the switching being reversible—in a working range which comprises all or part of the visible range, which working range includes the maximum absorption wavelength of said dichroic dye and even includes the absorption band of said dichroic dye, which working range is in particular of at least 200 nm or 300 nm, and even preferably of 380 nm to 780 nm.

It should further be noted that the stack (or the device, by virtue of the stack) is liable to exhibit (stable) scattering states which are switchable and reversible—also even for at least one wavelength of the infrared range (for example at a value between 800 nm and 2.5 μm, even from 800 nm to 2 or 2.5 μm).

The first state is the most scattering, in particular defined by a non-zero haze H0 or a non-zero diffuse transmission DT0.

The second state is less scattering than the first state and is preferably defined by a haze H1 less than H0 (or a diffuse transmission DT1 less than DT0) and non-zero.

In addition, the third state, being transparent or less scattering than the second state, is in particular defined by a haze H2 less than H1 or a diffuse transmission DT2 less than DT1).

At least two of the three states are obtained by applying an electric field (alternating or direct, preferably normal to the face A1) between the first and second electrodes.

The switching is reversible. The three states are reversible, and even stable.

The first scattering state is colored with a given color C0, in particular defined by a lightness L*0 (and additionally by a*0, b*0), the second, less scattering state, exhibits a given color 01 separate from C0, in particular defined by a lightness L*1 separate from L*0 (and additionally 01 defined by a*1, b*1) and in particular greater than L*0, in particular with L0*-L1*, in absolute value, of at least 1 or 2. In addition, even the third, least scattering, state of the three states also exhibits a color C2 separate from 01 and C0, in particular defined by a lightness L*2 (and additionally by a*2, b*2) separate from L1* and L0* and in particular greater than L1* (and L*0).

It was hitherto only possible, with a PSLC layer in nematic mesophase, to obtain two stable and reversible scattering states:
 one scattering state (in the off state)
 and the other transparent state, by an alignment of the liquid crystals parallel to the applied electric field (in the on state), starting from a threshold value necessary to overcome the restoring force of the liquid crystals.

Moreover, in the conventionally manufactured devices, when an electric field is applied in smectic mesophase, there is no reversible switching.

According to the invention, the polymeric network, and also the formation of domains with two-dimensional defects, in particular also enables the liquid crystals to be oriented and stabilized in a multitude of intermediate positions between the most scattering state and the most transparent state and also to induce a sudden change of direction (of the "light switch" type).

Depending on the applications, it is possible to use the invention between a transparent state and several scattering states or even between two or more scattering states.

An explanation on the microscopic scale is that, from T1, in the presence of the mesophase P, at least a fraction of the liquid crystals are mobile and able to be oriented in three positions which generate the three stable states, with the passage from one state to another being reversible. More broadly speaking, at least a fraction of the liquid crystals are mobile and able to be oriented in a multitude of positions generating a multitude of stable states, the passage from one state to another being reversible and quick.

In the present text, P or P' are mesophases which, by definition, differ from a crystalline phase or an isotropic phase. When applied to P or P', the term phase more specifically means mesophase.

Advantageously, the electric field (normal to the face A1) is alternating, in particular with a frequency from 10 Hz, 50 Hz, for example a frequency of 100 Hz, 1 kHz or 2 kHz. Voltage is intended to mean the peak voltage (Vpeak).

The changes of orientation of the liquid crystals are preferably induced by applying an electric field normal to the face A1 (in the midplane if the stack is curved, for example flexible, and between curved substrates, in particular made of glass).

Preferably, the relaxation time from one state to the other (from a scattering and colored state to a less scattering and less colored state, and vice-versa) is at most 1 s, or less.

It is possible in particular to move from a scattering state to the transparent state (in all or part of the visible range) by moving from 0 V to any non-zero value, in particular up to 220 V or 120 V and even at most 100 V or 80 V or 50 V.

The level of scattering can be controlled, in particular adjusted based on data collected by sensors (temperature, brightness, etc.) in communication with the device (controlling the power supply source).

It is also possible to design a switchable mirror with haze variation (first or second reflective layer, or else adding a mirror layer or an additional mirror).

The invention is preferably first of all based on the existence of 2D topological defects.

The addition of dichroic dye(s) adds the possibility of varying the color.

The change of color which is firstly reflected in a modification of the lightness L* is coupled with the change of haze. In particular:
- the haze may be maximum when no voltage is applied and the color darkest when no voltage is applied, and the haze may decrease and the color become pale (increase in the lightness L*) with increased voltage, until they stabilize,
- or the haze may be maximum when no voltage is applied and the color lightest when no voltage is applied, and the haze may decrease and the color become more intense (decrease in the lightness L*) with increased voltage, until they stabilize.

When the haze becomes constant, the lightness is too.

The dichroic dye may be an anisotropic organic molecule which has optical anisotropy, is elongated, in particular rod-shaped. It is dissolved in the material, in particular dissolved in the liquid crystals. The % of (each) dichroic dye is adjusted so as not to exceed the solubility limit. In particular, one (or more) dichroic dye(s) is (are) chosen which is (are) chemically compatible with the liquid crystals.

In particular, the (each) (elongated, rod-shaped) dichroic dye may have a long molecular axis and the absorption varies along the long axis or the short axis. The dye may be defined by the dichroic ratio thereof, which may be positive or negative.

The (each) dichroic dye is controlled by the orientation of the liquid crystals, the movement (the rotation) of the liquid crystals under the effect of the electric field (normal to the face A1) tending to be aligned with the electric field, leading to the movement (the rotation) of the dichroic dye, the long axis also tending to be aligned with the electric field (to be normal to the face A1).

There may be, therefore, like the scattering states generated by the liquid crystals, a multitude of colored states ranging from the initial color without field to the final color (more influence from the electric field) which are all orientations of the long axis relative to the electric field.

As is known, the absorption of a dichroic dye varies based on the orientation thereof relative to the polarization of the incident light. On the contrary, a non-dichroic dye, which does not exhibit absorption anisotropy, is insensitive, or not very sensitive, to the electric field and will even not change the absorption. Such dyes may be added to adjust the desired hue.

There are several families of dichroic dyes, in particular those described in the publication by Mark T Sims entitled "dyes as guests in ordered systems: current understanding and future directions" Liquid Crystals, 2016, Vol 43, NOS. 13-15, page 2363-2374.

The dichroic dyes according to the invention may be azo dyes, with AZO (—N=N), in particular rod-shaped. It is possible to induce chemical changes to the azo dyes, for example with ester groups incorporated (cf. p. 2366 of the above-mentioned publication).

Other dyes are anthraquinones, which are generally fused rings, or rod-shaped by adding substituents. Examples of dichroic dyes (chromophores) are in table 1 of this above-mentioned publication.

For example, the dichroic dye is added to first liquid crystals (to phase P, preferably nematic) and does not form covalent bonds with these liquid crystals (but with optional van der Waals interaction).

Nonetheless, one or more dichroic dyes according to the invention may be mesogenic, in a mixture with the mesogen in mesophase P.

The, or one of the, dichroic dyes may be fluorescent (for example like one described in table 1 of the above-mentioned publication), which will make it possible to cause a change in hue under the effect of light or ultraviolet radiation when no electric field is applied, and under said electric field.

Independently, it is possible to color one or more of the elements of the device (electrode, anchoring layer, substrate or support, lamination interlayer, glass backing, etc), for example with a maximum absorption separate from the dichroic dye.

Examples of dichroic dyes which are suitable for the invention are additionally mentioned in the book entitled "Electrooptic effect in Liquid Crystal Materials" by L. M Blinov et al., published by Springer in 1994, in particular in chapter 2.3 entitled "Optical Anisotropy and Dichroism" and pages 66 to 68, including table 2.2.

The CIE 1976 L*a*b* color space, generally referred to as CIELAB, is a color space which is particularly used for characterizing surface colors. Three values, L*a*b*, are used: lightness L* results from surface luminance, and the two parameters a* and b* express the difference of the color from that of a gray surface of the same lightness. The existence of a gray, uncolored, achromatic surface implies explicitly indicating the composition of the light which illuminates the colored surface. This illuminant is standardized daylight, D65.

The CIELAB color space is defined from the CIE XYZ space. Compared to the latter, it has the advantage of distributing colors more in line with the perception of color deviations by the human visual system. It is also possible to define a color difference deltaE between a color (C1 or C2) and C0 (reference color) or C2 and C1, defined by the square root of the sum of the difference to the square of L*, of the difference to the square of a*, and of the difference to the square of b*. The deltaE between a color (C1 or C2 or any other color under electric field) and C0 in the present invention may be at least 1 or even at least 7.

Advantageously, the first (most scattering) state is accessible in the absence of said applied electric field (normal to the face A1), the second and third states are accessible in the presence of said applied electric field, preferably alternating, and even at a frequency of at least 10 Hz or 50 Hz, in order to prevent discharges which reduce the optical performance, the second state being obtained for a voltage V1 and the third state being obtained for a voltage V2, greater than V1, in particular with at least a difference between V2 and V1 of 5 V, 10 V, 20 V.

For example, V1 is between 0.5 V or 1V or 2 V and 20 V, and V2 is between 20 V, 25 V and 120 V or 80 V or 50 V.

More broadly speaking, it is possible to vary the haze (in the visible range) and the color when the amplitude of the field/the voltage V is varied.

Each haze is for example defined as the ratio of the diffuse transmission DT to the total transmission TT. Preference is given to expressing it in %.

The haze H0 (zero voltage), H1 (at V1) or H2 (at V2) (and any other haze value) is preferably defined as the ratio between the integrated light transmission associated with the diffuse transmission DT and LT.

Thus, the stack (and even the device) may exhibit a haze (and/or a diffuse transmission) which varies (in particular decreases) with the voltage in all or part of a voltage range between 0.5 V and 120 V or 220 V (for example between 0.5 V or 1 V or 10 V and 50 V) and even from 0.1 V or 1 V (in particular with a thickness E0 of electroactive layer of at most 20 μm).

Regarding the (integrated) haze, the relative difference in % between H0 and Hv can be, in absolute value, preferably at least 30%, 50%, 70%, where Hv is the value under (alternating) electric field and H0 without electric field, and in particular H0 is greater than Hv.

Regarding the (integrated) light transmission LT, the relative difference in % between LT0 and LTv can be preferably at least 5%, 10%, where LTv is the value under (alternating) electric field and LTv without electric field.

Regarding the (integrated) light absorption LA, the relative difference in % between LA0 and LAv can be, in absolute value, preferably at least 5%, 10%, 20%, where LAv is the value under (alternating) electric field and LA0 without electric field, and in particular LA0 is greater than LAv.

Regarding the (integrated) light reflection LR, the relative difference in % between LR0 and LRV can be preferably at most 5%, 2%, 1%, where LRV is the value under (alternating) electric field and LR0 without electric field.

LR may be relatively constant (independent of the electric field applied) outside the absorption band, in particular by at most 10% in the visible range, when the first and second electrodes are transparent, as are their optional substrate and support (and also the anchoring layers), in particular non-colored substrate and support.

The optical performance properties are also defined by wavelength measurements per wavelength, in particular by distinguishing the part impacted by the dichroic dye.

Regarding the (total light) absorption measured for each wavelength in the visible spectrum, preferably:

the difference $AT_0-AT_v$ is at most 2% or even at most 1% for a (each) wavelength outside the absorption band of the dichroic dye, where $AT_v$ is the absorption value under (alternating) electric field and $AT_0$ without electric field, and/or the relative difference in % between $AT'_0$ and $AT'_v$ is at least 10% or even 1% for a (each) wavelength within the absorption band of the dichroic dye, where $AT'_v$ is the absorption value under (alternating) electric field and $TA'_0$ without electric field.

The total absorption AT may be relatively constant (independent of the electric field applied) outside the absorption band, in particular by at most 10% in the visible range, when the first and second electrodes are transparent, as are their optional substrate and support (and also the anchoring layers), in particular non-colored substrate and support.

Regarding the total light transmission TT measured for each wavelength in the visible spectrum, preferably:

the difference $TT_0-TT_v$, in absolute value, is at most 5% or even at most 3% or 1% for a (each) wavelength outside the absorption band of the dichroic dye, where $TT_v$ is the light transmission value under (alternating) electric field and $TT_0$ without electric field, and/or the relative difference, in absolute value, in % between $TT'_0$ and $TT'_v$ is at least 5% or even 10% or 20% for a (each) wavelength within the absorption band of the dichroic dye, where $TT'_v$ is the light transmission value under (alternating) electric field and $TT'_0$ without electric field.

The total transmission TT may be relatively constant (independent of the electric field applied) outside the absorption band, in particular by at least 40% in the visible range, when the first and second electrodes are transparent, as are their optional substrate and support (and also the anchoring layers), in particular non-colored substrate and support.

Regarding the diffuse transmission DT measured for each wavelength in the visible spectrum, preferably:

the difference $DT_0-DT_v$, in absolute value, is at most 5% or even at most 3% or 1% for a (each) wavelength outside the absorption band of the dichroic dye, where $DT_v$ is the diffuse transmission value under (alternating) electric field and $TT_0$ without electric field.

and/or the relative difference, in absolute value, in % between $DT'_0$ and $DT'_v$ is at least 20% or even 50% or 70% for a (each) wavelength within the absorption band of the dichroic dye, where $DT'_v$ is the diffuse transmission value under (alternating) electric field and $DT'_0$ without electric field.

For example, for a blue dye, it is possible to choose, as maximum absorption wavelength, 630 nm±10 nm and, as wavelength outside the absorption band, 430 nm±50 nm or ±10 nm. Mention may be made, for example, of the dye M412 sold by Mitsui Chemicals.

For example, for a red dye, it is possible to choose, as maximum absorption wavelength, 500 nm±10 nm and, as wavelength outside the absorption band, 650 nm±50 nm or ±10 nm. Mention may be made, for example, of the dye SI-426 sold by Mitsui Chemicals.

For example, for a yellow dye, it is possible to choose, as maximum absorption wavelength, 400 nm±10 nm and, as wavelength outside the absorption band, 600 nm±50 nm or ±10 nm. Mention may be made, for example, of the dye SI-486 sold by Mitsui Chemicals.

For example, for a black dye, mention may be made of the dye SI-428 sold by Mitsui Chemicals.

At T', the haze can be measured by pressing the device according to the invention against a circular entrance window with a radius equal to 10 mm of an integrating sphere of a diameter equal to 150 mm and coated on the inside with a material referred to as spectralon which is a fluoropolymer of PTFE type manufactured by Labsphere. For example, T' is chosen to be=T1+at least 5° C.

The integrating sphere comprises an exit window made of spectralon diametrically opposite the entrance window, which is circular and has a radius equal to 10 mm.

The total transmission is measured with the exit window of the integrating sphere.

The diffuse transmission is measured by removing the exit window of the integrating sphere.

Each wavelength is sent, with an intensity I0, to the device (beam normal to the device) in front of said integrating sphere.

At T', the total transmission or the diffuse transmission can be measured when the electric field is applied (with a voltage which may vary with a step of 10 V, for example).

The signal received (I_TT or I_DT) is then compared with I0 in order to deduce the transmissions therefrom.

It is possible to measure in the infrared range in the same way.

The haze value (of DT) without applied electric field (or for a given voltage) can vary based on the size or the type of two-dimensional defects, on their density, on the thickness of the electroactive material, on the choice of the liquid crystals, on the polymer network (degree of crosslinking, polymerization condition).

The haze value without applied electric field (or for a given voltage) can also vary based on the orientation of the dichroic dye(s), in particular based on the angle between the long (molecular) axis of the dichroic dye and on the polarization axis X of a light polarized along the plane parallel to the surface of the layer of liquid crystals.

Thus, to adjust H0 (and indirectly Hv) in a tailored manner, the device according to the invention can comprise a linear polarizer with a polarization axis (X) in the plane parallel to the face A1. The polarizer is placed between the polarized or non-polarized light source (sun, daylight, artificial light) and the layer of liquid crystals, more practically on the side, and even on the face of, the support, in particular face A2. The polarizer may optionally be rotatable in order to modify the direction of the X axis.

Moreover, the mesophase P, for example nematic or non-smectic, in particular non-smectic A, may not intrinsically generate the two-dimensional defects. These defects are then produced in a mesophase P' closer to that of the crystal, such as the smectic phase (in particular A), fixed by a polymeric network, and held (more or less perfectly) in the phase P.

Also advantageously, said domains of the mesophase P are domains remaining from another mesophase P' and, in particular, the phase P is nematic, the phase P' is smectic, and said defects are smectic defects.

It is possible to say in particular that the polymeric network retains (bears the mark of) the organization and orientation of the liquid crystals in phase P' (for example smectic), and therefore in turn orients the liquid crystals in phase P (for example nematic) in order to form the domains with the defects (for example smectic).

The electroactive layer can also preferably still have at least two mesophases P (starting from T1) and P' (below T1). It is possible to determine the P to P' transition by differential scanning calorimetry, or PLM.

At T', the material may exhibit several mesophases P, in particular nematic (for example non-twisted nematic and twisted nematic), each with defects remaining from the mesophase P' (preferably smectic, in particular A). It may be preferred for the material to exhibit a single mesophase P', in particular smectic, in particular A, at a temperature of less than T'.

The molecular order differs from one mesophase to another. The mesophases differ by the type and the degree of self-organization of the molecules; the collective directional behavior depends on the nature and structure of the mesogens.

In particular, the material may exhibit another mesophase P', the mesophase P is further from the crystalline phase than the mesophase P' (optionally adjacent, which is therefore the first mesophase), in particular, the mesophase P is nematic.

The mesophase P preferably exhibits one less positional order than a mesophase P' of the material, in particular, the liquid crystals are on average parallel with one another, i.e. with at least one long-range spontaneous orientational order.

The mesophase P may exhibit (adopt) a structure in particular imposed by the polymeric network, substantially (comparable to) layers of liquid crystals with curved zones of layers of liquid crystals and optionally planar zones of layers of liquid crystals.

The mesophase P may be the furthest from that of the crystal, in particular with one solid order less, with a degree of freedom less than a mesophase which is closer to the crystal.

The mesophase P may be the closest to that of the isotropic liquid.

In addition, the material preferably comprises a mesophase P' up to a temperature of less than or equal to T1, the change from the mesophase P' to the mesophase P being reversible, direct or indirect.

The two-dimensional defects may be formed by stresses imposed in phase P' by the use of anchoring layers.

In said mesophase P, the domains may have a wide distribution of sub-meter size (in particular less than 10 cm), even sub-centimeter and even sub-millimeter size, in particular of micron size, from 1 to 200 µm, or even sub-micron size, and better still of at least 50 nm.

It is possible to characterize the mesophase P in particular by polarized light microscopy, referred to as PLM.

Advantageously, at T', without said electric field and/or under said electric field, the domains are characterized by polarized light optical microscopy, PLM (at a magnification of at least 20×, for example), each domain being defined on the image of said PLM by a surface referred to as visible surface, SD, which may have an equivalent sub-metric diameter (in particular less than 10 cm), even sub-centimetric and even sub-millimetric, in particular micronic, from 1-200 µm, or even sub-micronic, and better still of at least 50 nm.

The contour LD of the visible surface SD may include or correspond to the vertical projection of a closed line defect forming the base of the domain.

This contour LD may be:
uneven, close to an ellipse, a circle, a rectangle or a square
even, like an ellipse, a circle, a rectangle or a square.

The density of the domains may be of at least 10 domains/mm$^2$ or even at least 100 domains/mm$^2$, in particular determined by the number of visible surfaces SD.

For example, on the image, a rectangle of predefined dimensions is defined, and the number of visible surfaces SD is counted.

The arrangement of the domains may be regular (periodic or pseudo-periodic), i.e. with repetition of the domains.

The arrangement of the domains and/or inside the domains may be random and depends substantially on the manufacturing method thereof.

There may be several sizes of visible surfaces SD, for example at least two or three.

The domains may have a occupancy rate of at least 2%, 10%, 50%, 70%, in particular measured by processing images in polarized light optical microscopy (said PLM) by the occupancy rate of the visible surfaces SD.

In particular, it is possible to define a visible surface SD domain under preferably alternating electric field, for example at 25 V or 12 V.

In a PLM image, a domain with line defects may have a multilobal shape (with a brightness contrast).

In a PLM image, a domain has TFCD-type defects which may have four lobes, analogous to a four-leaf clover.

In a PLM image, a domain has non-TFCD-type defects which may have two lobes (and the texture may resemble a stitch of a jersey knit).

The width or the equivalent diameter of the visible surface SD may in particular be sub-millimetric and in particular between 0.5 and 200 µm.

In a PLM image, each visible surface SD domain may be delimited with a black (or less more dark) closed line of width Ln which is in particular at most 200 μm and/or even at most LD/10 or LD/20.

Moreover, the electroactive layer may be devoid of charged particles (ions, cations), with a discharge under said electric field.

It is known that a layer of liquid crystals can be organized in columns with discotic liquid crystals in particular. Among column-like structures, the "spherical" or mosaic textures are known, and combinations thereof.

In the mesophase P, the electroactive layer may be structured in columns of liquid crystals.

It is known that a layer of liquid crystals in smectic mesophase may be organized into layers (with calamitic or discotic liquid crystals in particular), unlike a conventional nematic mesophase of the prior art. These layers are of a thickness on the nm scale.

However, restricted within a volume, these layers may not be planar at every point, and hence are greatly inclined and on a very large scale (compared to the liquid crystal molecules). These layers are for example of a thickness Ec on the nm scale.

Among layered structures, textures with focal domains are known in the smectics.

By analogy, in the mesophase P, the electroactive layer can be structured in layers of liquid crystals of thickness Ec on the nm scale (for example at most 100 nm) and, in a novel way, this may be a phase which is not smectic.

The domains may be comparable to (or of the type of) focal conic domains (FCD) of the smectic phases (A), in particular toric (TFCD), non-toric (non-TFCD, parabolic, semi-cylindrical (in particular "oily streaks"), fan-shaped FCD.

For example, without electric field, the domains of TFCD type comprise:
  in a central zone, planar layers parallel to one another and to the electrodes, with the liquid crystals oriented to the normal.
  and, in the boundary zones, inclined, curved layers (while retaining the thickness Ec).

The defects cause these highly curved zones.

In the off, scattering, state, the liquid crystals tend to be oriented normal to the layers (and to the electrodes) in the planar layer zones, and to be tangential to the layers in the curved layer zones (without varying the thickness Ec).

The two-dimensional defects are for example line defects selected from an even or uneven closed contour, such as an even or uneven circle, an even or uneven ellipse, a square or rectangle and/or a linear, elliptical, parabolic, hyperbolic geometry and, in particular, the layer comprises a first type of closed defects and a second type of defects.

As an example of focal conic domains, mention may be made of those described in the publication entitled "periodic of frustrated focal conic defect in smectic liquid crystal films", B Zappone et al., Soft Matter 2012, 8, pp. 4318-4326, and also the publications cited in this document.

As already indicated, the device according to the invention can comprise a linear polarizer with a polarization axis (X) in the plane parallel to the face A1.

When the defect domains are for example non-TFCD (implying a unidirectional planar anchoring layer, along the brushing axis and a normal anchoring layer as described below), it is observed that if X is normal to the brushing axis, then the absorption by the dichroic dye appears to be minimal. If X is parallel to the brushing axis, then the absorption by the dichroic dye appears to be maximal.

When the defect domains are for example of TFCD type (implying a degenerate planar anchoring layer and a normal anchoring layer, as described below), it is observed that only the dichroic dye molecules oriented on average along the X axis of the polarizer or for which the projection of the long axis of the dichroic dyes along the X axis of the polarizer is non-zero absorb, the zones of the defect domains then appearing colored.

If the X axis of the polarizer is turned, the zones which appear colored on the PLM images turn, following the rotation of the X axis of the polarizer.

Macroscopically, the lightness L* is modified.

Preferably, use is made of anchoring layers which serve to anchor the liquid crystals by surface interactions during manufacture, in the absence of an applied field.

At the surface of the anchoring layers, the crystals may remain attached thereto up to a certain field strength (voltage).

For the formation of the domains comprising defects, the stack of layers may thus further comprise:
  in contact with the face A1, a first liquid crystal surface anchoring layer, able to anchor at least a fraction of the liquid crystals (in the domains) in contact with this first anchoring layer in a first, preferably planar, orientation in the absence of said applied electric field, preferably transparent (optionally tinted) first anchoring layer, in particular of thickness $E_1$ which is at most micrometric and even sub-micrometric
  in contact with the face A2, a second surface anchoring layer, in particular normal or degenerate planar, able to orient a fraction of the liquid crystals in contact with this second anchoring layer in a second orientation, similar to or separate from the first orientation, in the absence of said applied electric field, which second anchoring layer is preferably transparent (optionally tinted) and of thickness $E'_1$ which is at most micrometric and even sub-micrometric.

The anchoring layers, which in particular oppose one another, serve to generate 2D topological defects which contribute to the above-mentioned electro-optical properties. There may even be more than two anchoring layers (three or more), then, there are several layers of liquid crystals spaced apart by anchoring layers.

There may also be, on a same surface, several separate anchoring zones. These defects are generated by mechanical deformations of the structure of the material and are obtained by the stresses applied by the two anchoring layers, forcing the liquid crystals into contact which these layers at specific and separate orientations.

One of the layers may be at the boundary of an air gap (normal anchoring function), preferably of constant thickness to avoid iridescence, between the second electrode and the face A1. The air gap may be obtained by peripheral spacers and/or spacers which emerge from the electroactive layer (transparent, in particular plastic, glass, in particular beads), in particular heightwise (and even having the larger dimension).

The first anchoring layer may be a planar anchoring and the second anchoring layer is a normal anchoring or the first anchoring layer may be a degenerate planar anchoring and the second anchoring layer is a degenerate planar anchoring.

The planar anchoring may be:
  without a preferred direction (referred to as degenerate) or unidirectional, fixing the zenithal and azimuthal orientation of the liquid crystal director n), for example by texturization, brushing (or rubbing) the planar anchoring layer, for example comprising nanogrooves or microgrooves or even in several crossed directions (at 90°, etc.) by texturization, brushing of the planar anchoring layer.

Use may be made of a velvet fabric for the brushing.

The first anchoring layer, in particular hydrophilic anchoring layer, is for example:

dielectric (in particular amorphous, polymeric and/or mineral, a glass) with a functionalization of the surface Sb; in particular, a layer based on polyimide polyvinyl alcohol (PVA), for example for a planar anchoring or semiconducting such as molybdenum disulfide, or molybdenum (IV) sulfide, electroconductive, in particular which is a fraction of the thickness of the first electrode.

For a unidirectional planar anchoring, use may be made of a film of fluoropolymer, such as polytetrafluoroethylene, PTFE, or teflon (with the polymer chains aligned in the direction of displacement of the teflon bar during deposition).

The second anchoring layer is for example:

dielectric (in particular amorphous, polymeric and/or mineral, a glass) with a functionalization of the surface S'b (silanization for a normal anchoring), in particular, a layer of polyimide polyvinyl alcohol (PVOH) for a planar anchoring or semiconducting or electroconductive, in particular which is a fraction of the thickness of the second electrode a gas or air gap (if a normal anchoring is desired).

One of the anchoring layers may be an amorphous polymer (poly(methyl methacrylate) PMMA, polycarbonate, polystyrene) with optional texturing or brushing, and the other of the anchoring layers may be made of crystalline polymer (PET, nylon, poly(butylene terephthalate) PBT, PVA) with optional texturing or brushing.

For a normal anchoring, the most commonly used layers are based on octyltrichlorosilane (OTS) and N,N-dimethyl-N-octadecyl-3-aminopropyltrimethoxysilane chloride (DMOAP).

A layer based on sodium dodecyl sulfate (SDS) or even mixtures of alkanethiols may also generate normal anchoring.

One of, or the first and second anchoring layers are for example deposited by the liquid route, respectively on the first and second electrodes (self-supporting or deposited).

The first anchoring layer may be a preferably thin (flexible) film, for example of at most 200 µm or 50 µm which, in particular bears the first electrode (which in turn has a free surface, for example the external face or in an internal space of a multiple glazing or else in contact with a functional, in particular flexible, polymeric film (scratch-resistant, with functional coating for example for solar control, low emissivity or power supply for an (opto)electronic) device, etc.) or a lamination interlayer, such as EVA or PVB, detailed below (adhesive contact)

or is connected to the first electrode by an optical adhesive, itself on a support such as a functional, in particular flexible and/or polymeric film (scratch-resistant, with functional coating opposite, for example for solar control, low emissivity or power supply for an (opto) electronic) device, etc.) and in turn optionally connected (in adhesive contact with a lamination interlayer, such as EVA or PVB (detailed below).

And/or the second anchoring layer may be a preferably thin (flexible . . . ) film, for example of at most 200 µm or 50 µm which, in particular:

bears the second electrode (which in turn has a free surface, for example the external face or in an internal space of a multiple glazing or else in contact with a functional, in particular flexible and/or polymeric film (scratch-resistant, with functional coating for example for solar control, low emissivity or power supply for an (opto)electronic) device, etc.) and in turn optionally connected (in adhesive contact with a lamination interlayer, such as EVA or PVB (detailed below).

or is connected to the second electrode by an optical adhesive (itself on a support such as a functional, in particular flexible and/or polymeric film (scratch-resistant, with functional coating opposite, for example for solar control, low emissivity or power supply for an (opto)electronic) device, etc.) and in turn optionally connected (in adhesive contact with a lamination interlayer, such as EVA or PVB (detailed below).

The thermotropic mesophases are classified by their degree of ordering and according to the morphology and the chemical structure of the mesogens.

In a preferred embodiment, the phase P is nematic, optionally twisted, and referred to as cholesteric, and the phase P' is smectic.

As nematic mesophase P, a biaxial nematic phase is also known (with orientational ordering in two directions) or else a nematic twist-bend phase.

The following are known among the smectics:

smectic A SmA (preferably), smectic B SmB, smectic C SmC, smectic I SmI, and smectic F, twisted or chiral smectics which have a center of asymmetry, with the notation *SmC-like* and the phases: E, G, H, J, K, which are of smectic type.

The transition between the (twisted or non-twisted) smectic phase and the nematic phase may be direct we direct by gradually increasing the temperature.

Strictly speaking, the phases J, G, E, K and h are of smectic type ("soft" crystals).

As reference manual, mention may be made of the Goodbye Handbook Visual Display Technology 2012.

The majority of smectic phases never pass directly to the nematic phase. Moreover, depending on the chemical compound, by gradually increasing the temperature, a smectic phase C may pass to a smectic phase A, then a nematic phase, or directly to a nematic phase without passing via the smectic phase A.

There may be one or more intermediate smectics between the phase A (smectic) and the nematic phase. For example, some compounds may have this sequence: G, J, SmI, SmC, SmA, N.

Discoids may form "discotic nematic" or "discotic cholesteric" phases, but they may also stack up to form column-like phases of variable geometry: vertical, oblique, etc (colH, ColR ColOBI). The columns are fluid in so far as the distances between two molecules of the same column fluctuate more or less strongly and there is no long-distance order. On the other hand, there is no positional correlation between the molecules belonging to two adjacent columns.

The very rich polymorphism of the smectic phases increases the types of possible textures.

The liquid crystals may be of varied forms:
calamitic: elongated cylindrical form (anisotropic geometry): a length L1 and a width W1 are defined, with L1/W1
and/or discotic: disk with aromatic body (several adjacent aromatic rings) D, columnar stack or layered structure (smectic phase)
banana-shaped curved core, for example with a B7 mesophase.

The liquid crystals may be molecules with an anisometric structure comprising alkyl or alkoxy end groups. (CH2)x.

Preferably, the liquid crystals have a rigid part, the aromatic core (in the case of thermotropic liquid crystals), and one or more flexible parts, generally aliphatic chains. The central part is commonly rigid for the formation of mesophases. The ends are flexible.

For lyotropic liquid crystals, the rigid part is substituted by an ion; this is the case, for example, for phospholipids, onto which one or more alkyl chains are grafted. These may be anisotropic micelles, in the form of rugby balls or disks.

This geometric anisotropy may be supplemented by chemical anisotropy if the rigid and flexible parts are polar and apolar, respectively, the molecule is then said to be amphiphilic or amphipathic.

The chemical structure may be as follows:

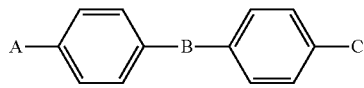

where
A: directing group (cyano, nitro, methyl, halogen, etc.)
B: bridging group (often linear) (alkene, ester, etc.)
C: alkane polyethers $C_nH_{2n+1}$ or perfluorinated $C_nF_{2n+1}$ (A=C sometimes)

Reference may also be made to the liquid crystals cited in patent GB0823013.

Metallotropic liquid crystals are those liquid crystals having one or more metal atoms in their molecular structure. The molecule is then referred to as "metallogen".

Preference is given to liquid crystals with smectic A and nematic mesophases.

As families of liquid crystals, mention may be made of:
cyanobiphenyls, for example 8CB which is 4-octyl-4'-cyanobiphenyl, alone or in a mixture with 4-cyano-4'-pentylbiphenyl (5CB),
a mesogen containing silicon, a mesogen with siloxane, an organosiloxane,
a benzoate.

Use may be made of the liquid crystals cited in patent WO2010/070606.

Use may also be made of the liquid crystals (alone or in a mixture with others) cited in the publication by Goodby et al., Liquid Crystals, June 2015, entitled "what makes a liquid crystal? The effect of free volume on soft matter":
sexiphenyl (FIG. 1),
quinquephenyl,2',3''''-dimethylsexiphenyl, undecyloxy and dodecyloxycyanobiphenyl (FIG. 1)
those of table 3, in particular the first 3
those of table 5
NTBs ("twist-bend nematic").

It is possible to make mixtures of liquid crystals to lower the transition temperature T1 between phases P and P', for example between smectic (A) and nematic. For example, a mixture of 8CB and 5CB (which does not have a smectic phase) to lower T1.

The polymers are for example obtained from the following polymer precursors
diacrylates, dimethacrylates
polymerizable dicyclohexylbenzenes, described in document GB0217907
polymerizable monocyclic compounds, described in document DE10257711
polymerizable compounds comprising a cinnamic acid group an acetylene group, described in document GB0308987
polymerizable tolanes, described in document GB0308984
polymerizable heterocyclic acetylenes, described in document GB0308990.

It is possible to choose polymers having temperature resistance in order to produce a laminated glazing, for example at a lamination temperature of at least 100° C., 120° C., 140° C.

The same applies for the liquid crystals and also the stack of layers.

Of course, the liquid crystals may extend substantially over the whole surface of the first electrode (and/or the substrate) or over (at least) a limited zone; the liquid crystals may optionally be over several zones.

The electroactive layer may be a solid layer (of any, in particular geometric, shape) or form a sign (symbol, pictogram, etc.).

The electroactive layer may be surrounded by, and even be in contact with, a polymeric sealing adhesive seal, for example made of epoxy acrylate, for example cyanoacrylate.

Moreover, use is made of spacers which may preferably be made of a transparent plastic material. The spacers determine (roughly) the thickness of the electroactive layer. Preference is given for example to polymethyl methacrylate (PMMA) spacers.

The spacers are preferably made of a material having an optical index (substantially) equal to the optical index of the layer. The spacers are for example in bead form.

The dielectric substrate of the first electrode (and/or the support of the second electrode) may or may not be made of flexible plastic material, for example (a film) of thickness of at most 300 µm or 150 µm or at least 1 mm. The plastic material is in particular based on polyester, in particular a polyethylene terephthalate (PET), polyethylene naphthalate (PEN), polycarbonate (PC), a polyolefin (polyethylene, polypropylene), polyurethane (PU), polymethyl methacrylate (PMMA), polyamide, polyimide, or a polyvinyl chloride (PVC) or even a fluorinated polymer such as ethylene tetrafluoroethylene (ETFE), polyvinylidene fluoride (PVDF), polychlorotrifluoroethylene (PCTFE), ethylenechlorotrifluoroethylene (ECTFE), fluorinated ethylene propylene (FEP) copolymers.

The absorption of the plastic material is preferably less than 0.5% or even at most 0.2% and with a haze of less than 1.5% and even of at most 1%.

PET is preferred for its transparency, surface quality, mechanical strength, availability at all sizes, or else PC or PMMA. The choice depends in particular on the flexibility sought.

The dielectric substrate of the first electrode (and/or the support of the second electrode) may be of larger dimensions than the electroactive layer.

In particular, said substrate (and/or said support) may be coated with an electroconductive layer covering all or part of the main face thereof (for example at least 50% or 80%) and a region of which forms the first electrode (the second electrode), in particular electrically insulated (by one or more insulating lines, laser etching, etc.) from another region of this layer. This electroconductive layer may be low emissivity serve as solar control layer.

Use may for example be made of a clear PET film coated with an electroconductive layer, for example a clear PET film referred to as XIR from Eastman, a co-extruded PET-PMMA film, for example of SRF 3M® type (SRF for Solar Reflecting Film), but also of many other films (for example made of PC, PE, PEN, PMMA, PVC) etc.

One of the free external faces of the stack may comprise a temporary protective plastic film (or liner) with an adhesive layer (acrylic, etc.) covering the whole face or forming a peripheral frame. This adhesive layer may serve to fix the stack to any type of planar or curved support which is transparent, such as a glazing or a plastic film, or which is opaque (wall) if the device is a switchable mirror (the electrode intended to be on the support side is then reflective).

For the electrodes, use may be made of conductive polymers from at least one of the following families:
the family of polythiophenes, such as PEDOT (3,4-polyethylenedioxythiopene), PEDOT/PSS, i.e. (3,4-polyethylenedioxythiopene mixed with polystyrene sulfonate, and any other derivative as described in application US2004253439,
or else poly(acetylene)s, poly(pyrrole)s, poly(aniline)s, poly(fluorene)s, poly(3-alkyl thiophene)s, polytetrathiafulvalenes, polynaphthalenes, poly(p-phenylene sulfide), and poly(para-phenylene vinylene)s.

For the polythiophenes, the product sold by H0 Strack under the name BAYTRON® or by Agfa under the name Orgacon®, or Orgacon EL-P3040® may for example be chosen.

To connect the stack of layers to a sheet, use may be made of a PSA.

PSAs are generally based on an elastomer coupled with an appropriate additional adhesive agent or "tackifying" agent (for example an ester resin).

The elastomers can be based:
on acrylates, which may be sufficiently tacky not to require an additional tackifying agent
on nitriles
on silicone, requiring special tackifying agents, such as silicate resins of "MQ" type composed of monofunctional trimethylsilane ("M") which has reacted with quadrifunctional silicon tetrachloride ("Q"). PSAs based on silicone are, for example, polydimethylsiloxane gums and resins dispersed in xylene or a mixture of xylene and toluene.
on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers,
on vinyl ethers.

Advantageously, the pressure-sensitive adhesive is chosen from PSAs based on acrylates and PSAs based on silicone. These adhesives are sold in the form of double-sided adhesive rolls. Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

In preferred embodiments, the stack may comprise the following sequence (strict, or not) (the elements between brackets being optional):
stack no. 1: (scratch-resistant or 'liner')/PET substrate/first electrode (such as ITO etc)/first anchoring layer/)electroactive layer(/second anchoring layer/) second electrode (such as ITO etc)/PET support/(scratch-resistant)
stack no. 2: Glass (tinted and/or curved, for example)/first leaf of lamination interlayer (PVB or EVA) or optical adhesive/PET substrate/first electrode (such as ITO etc)/(first anchoring layer/)electroactive layer/(second anchoring layer/) second electrode (such as ITO etc)/PET support/(scratch-resistant)/second sheet of lamination interlayer (PVB or EVA, like the first) or optical adhesive/glass (tinted and/or curved for example.

Each film is preferably flexible, planar or curved, able to adapt to the curve(s) of a glazing or other support, for example. Each substrate or support may be flexible, planar or curved, able to adapt to the curve(s) of an additional glazing or other support, for example.

The main faces of each layer (and/or of each substrate) may be rectangular, square or even of any other shape (round, oval, polygonal, etc.). Each barrier layer and/or substrate may be of a large size, for example of a surface area greater than 0.02 $m^2$ or even 0.5 $m^2$ or 1 $m^2$.

The or each layer—deposit or film—(and/or each substrate) may be transparent and preferably exhibit a light transmission $L_T$ of greater than or equal to 70%, preferably greater than or equal to 80% or even to 90%.

The or each layer—deposit or film—may be tinted, for example blue, green, gray or bronze. The light transmission LT may then be at most 55%, in particular from 20% to 50%.

The or each substrate, in particular made of glass, may nonetheless be tinted, for example blue, green, gray or bronze.

The first and/or the second electrode may be solid layers rather than patterned (with holes and/or discontinuity lines).

On the dielectric substrate (or support), the first electrode (the second electrode), preferably transparent, may be mineral; in particular, the mineral electroconductive layer is based on one or more transparent conductive oxides or a metal layer of at most 20 nm, preferably within a stack of thin layers of metal or silicon oxides and/or nitrides.

The first electrode and/or the second electrode may be a layer of transparent conductive oxide, referred to as TCO layer.

The TCO layer is preferably of a suitable thickness to have an ("intrinsic") sheet resistance of less than or equal to 150Ω/□, preferably less than or equal to 120Ω/□.

The TCO layer is for example supplied with electricity via current-supplying means which are preferably metal (based on silver, copper, etc.), preferably in the form of a (metal) strip/along an edge.

The barrier film or the substrate (support) bearing the TCO layer may protrude beyond the electroactive layer in order to promote electrical connection, for example carried out as in application WO2011/161391 (FIG. 1 or other figures) or EP1653275.

The layer of a transparent electroconductive oxide is preferably a layer of indium tin oxide (ITO). Other layers are possible, including thin layers:
based on indium zinc oxide (IZO), indium gallium zinc oxide (IGZO)
based on doped zinc oxide, preferably gallium- or aluminum-doped (AZO, GZO), based on niobium-doped titanium oxide, based on cadmium or zinc stannate, based on fluorine-doped tin oxide ($SnO_2$:F), based on antimony-doped tin oxide.

In the case of aluminum-doped zinc oxide, the doping level (i.e., the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%.

For layers based on fluorine-doped tin oxide, the atomic percentage of fluorine is preferably at most 5% and generally from 1 to 2%.

ITO is particularly preferred, or even IZO, AZO, GZO or IGZO. Easily deposited by a cathode sputtering process, in particular assisted by a magnetic field, called a "magnetron process", these layers are characterized by a lower roughness than by CVD.

The electrodes commonly used are made of mixed indium tin oxide (ITO). In order to be protected against short circuits generated by conductive impurities of a size which is greater than or equal to the distance between the electrodes, each of the ITO layers may be coated with one or more dielectric layers of oxides or nitrides, such as $Si_3N_4$, $SiO_2$, as mentioned in document WO2014/072596, of a cumulative thickness from 50 to 150 nm.

One of the advantages of fluorine-doped tin oxide is, on the other hand, its ease of deposition by chemical vapor deposition (CVD), which can be implemented on the flat float glass production line. In one embodiment, the layers of the stack are obtained by chemical vapor deposition, directly on the float glass sheet production line. The deposition is carried out by spraying precursors through nozzles on the ribbon of hot glass. The different layers may be deposited at different locations on the line: in the float chamber, between the float chamber and the lehr, or in the lehr. The precursors are generally organometallic molecules or molecules of halide type.

By way of examples, mention may be made, for the fluorine-doped tin oxide, of tin tetrachloride, monobutyltin trichloride (MTBCL), trifluoroacetic acid, hydrofluoric acid. The silicon oxide may be obtained using silane, tetraethoxysilane (TEOS), or else hexamethyldisiloxane (HDMSO), optionally using an accelerator such as triethyl phosphate.

It is also possible to deposit, between the substrate and the TCO layer, a stack of neutralizing layers. Such layers (at least two layers) make it possible to influence the reflective appearance of the glazing, in particular the reflective color thereof. Once the electroconductive support is coated with the layer of liquid crystals (and even once another identical electroconductive support has been added), preferably neutral, slightly blue-tinged or green colors are obtained, characterized by color coordinates a*, b* close to 0, negative a*, b* or negative a* and slightly positive b* being preferred to purple, pink, and red colors (more positive a*).

In a preferred embodiment, the stack comprises, in this order on the main face under the TCO layer:
- a first underlayer based on silicon nitride ($SiN_x$, preferably $Si_3N_4$) optionally doped, preferably with aluminum, of thickness $e_y$ from 5 to 50 nm, or better still from 10 nm to 35 nm, preferably (directly) in contact with the main face and preferably substantially consisting of a silicon nitride, optionally doped, preferably with aluminum;
- a second underlayer based on silicon oxide ($SiO_x$, preferably $SiO_2$), of thickness $e_z$ from 10 to 50 nm, or better still from 20 nm to 50 nm, preferably substantially consisting of silicon oxide, which underlayer is non-doped or optionally doped, preferably with aluminum, preferably in contact with the TCO layer.

More broadly speaking, the underlayer (single, in particular) may be a layer based on silicon oxynitride (SiON).

Some examples of stacks of thin layers forming the first electrode are given below:
$SiN_x/SiO_x$/TCO (preferably ITO)/$SiN_x$/(SnZnO)/$SiO_x$
$SiN_x/SiO_x$/TCO (preferably ITO)/$SiN_x$/SnZnO/$SiO_x$
$SiN_x$/(SnZnO)/$SiO_x$/TCO (preferably ITO)/$SiN_x$/(SnZnO)/$SiO_x$.
SIOxNy/TCO (preferably ITO)/$SiOxN_y$/(SnZnO)/$SiO_x$.

The different layers may be deposited on the substrate by any type of thin layer deposition process. These processes may for example be pyrolysis (liquid or solid), chemical vapor deposition (CVD), in particular plasma-enhanced (PECVD), optionally under atmospheric pressure (APPECVD), evaporation, or even sol-gel type processes.

The device according to the invention may comprise a laminated glazing comprising:
- a first additional sheet of glass, in particular of thickness from 0.7 mm to 4 mm
- a thermoplastic lamination interlayer
- a second additional sheet of glass, in particular of thickness from 0.7 mm to 4 mm or even of less than 0.7 mm, or else a sheet of plastic such as a polycarbonate or a PMMA (in particular with a PU lamination interlayer), the main internal faces, referred to as F2 and F3, of the first and second additional glass sheets facing one another, the stack being the faces F2 and F3 and preferably in the lamination interlayer.

Preferably, the thermoplastic lamination interlayer surrounds the edge of the stack.

The edge face of the stack may be set back relative to the outermost edge face of the lamination interlayer (or of the first sheet).

Preferably, the optional first and/or second substrates are preferably of a thickness of at most 0.7 mm and even of at most 0.3 or 0.2 mm. For the glass substrate(s), it is possible to choose thin glass (less than 1 mm) and even ultrathin glass (UTG).

One of the additional glass sheets may be tinted and the other may be clear or extra-clear. The thermoplastic lamination interlayer may be clear, extra-clear or tinted.

The device according to the invention may comprise a glazing, in particular laminated and/or curved, and the stack forms a strip, in particular a peripheral strip, over a portion of a main face of the glazing.

Use may be made of the device having variable scattering by liquid crystals as defined previously in a vehicle or building.

It may be used in particular as:
- internal partition (between two rooms or in one space) in a building, in a road, rail, marine or airborne vehicle (between two compartments, in a taxi, bus, train, etc.), in particular as a glazed shower or bathtub wall,
- glass door (entrance door or service door), window (single, double, triple glazing), ceiling, tiling (floor or ceiling), toilet door, a glazed part of home or street furniture
- glazing for a motor vehicle (car, truck, bus, coach, etc.) which is therefore a road, rail, marine (boat) vehicle, windscreen, side glazing, roof, etc.
- projection or backprojection screen,
- store window, window in particular for a booth.

Of course, it may form all or part of a glazing (a partition and window of transom type, etc.).

The device according to the invention may comprise a laminated and in particular curved glazing, and the stack of layers is between the first and second glazings, respectively said exterior and interior glazings, and forms a peripheral strip over an upper portion of the glazing, the edge face referred to as external of the stack being masked from the outside by a first opaque peripheral layer, in particular an enamel over the external glazing (preferably on face F2), and/or the edge face referred to as internal of the stack being masked from the inside by a second opaque peripheral layer, in particular an enamel over the internal glazing (on face F4 for example, or even face F3).

For the integration thereof into a laminated glazing, use may be made of:
- three sheets (PVB, EVA, PU, etc., monolayer or multilayer), in particular two solid sheets each in contact with one of the two glazings and a central sheet with a reserve for housing the stack
- two sheets (PVB, EVA, PU, etc., monolayer or multilayer), especially if the stack is thin enough for the two sheets to come together by creeping on either side of the stack.

For the substrate and/or the support or else for an additional glass sheet or a glazing of a laminated and/or multiple glazing, it is possible to choose a clear or extra-clear glass. A clear glass typically contains a content by weight of iron oxide of the order of 0.05 to 0.2%, while an extra-clear glass generally contains approximately 0.005 to 0.03% of iron oxide.

The additional glass sheet or a glazing of a laminated and/or multiple glazing may nonetheless be tinted, for example blue, green, gray or bronze.

An additional tinted glass sheet or a tinted glazing of a laminated and/or multiple glazing may preferably exhibit a light transmission $L_T$ greater than or equal to 10%—for example in a context in which the middle of the side of the external face of the substrate (opposite to the face with the electrode) is highly illuminated—, and is preferably greater than or equal to 40%.

The glass is preferably of soda-lime-silica type but it can also be a glass of borosilicate or alumino-borosilicate type. The thickness of the glass is generally within a range extending from 0.5 mm to 19 mm, preferably from 0.7 to 9 mm, in particular from 2 to 8 mm, or even from 4 to 6 mm.

The glass is preferably of the float glass type, i.e. able to be obtained by a method consisting of casting molten glass onto a bath of molten tin (called a "float" bath). In this case, the stack may equally well be deposited on the "tin" side as on the "atmosphere" side of the substrate. The terms "atmosphere" side and "tin" side are understood to mean those faces of the substrate that have been in contact with the atmosphere in the float bath and in contact with the molten tin, respectively. The tin face contains a small surface amount of tin that has diffused into the structure of the glass.

The thermoplastic lamination interlayer provides a connection to a rigid or flexible element. This polymeric lamination interlayer may in particular be a layer based on polyvinyl butyral (PVB), ethylene vinyl acetate (EVA), polyethylene (PE), polyvinyl chloride (PVC), thermoplastic urethane, polyurethane (PU), ionomer, polyolefin-based adhesive, thermoplastic silicone or multi-component or single-component, thermally crosslinkable (epoxy, PU), or UV-crosslinkable (epoxy, acrylic resin) resin.

The PVB interlayer can be wedge-shaped, thus with a cross section which decreases in wedge shape from the top toward the bottom of the laminated glazing in order to avoid a double image in the case of a head-up display (HUD), very particularly for a windscreen.

The PVB interlayer is optionally acoustic and/or tinted.

The acoustic PVB interlayer can comprise at least one "central" layer made of viscoelastic plastic with vibro-acoustic damping properties, in particular based on polyvinyl butyral (PVB) and plasticizer, and further comprising two external layers made of standard PVB, the central layer being between the two external layers.

Optionally, one or both external layers has a cross section which decreases in wedge shape from the top toward the bottom of the laminated glazing, the layer made of viscoelastic plastic with vibro-acoustic damping properties having a constant cross section from the top toward the bottom of the laminated glazing: as an example of acoustic sheet, mention may be made of patent EP0844075.

The first and/or second glazing of the laminated glazing can (depending on the aesthetic result or the optical effect desired) be a clear glass (with a light transmission $T_L$ greater than or equal to 90% for a thickness of 4 mm), for example a glass of standard soda-lime composition, Planilux® from Saint-Gobain Glass, or an extra-clear glass ($T_L$ greater than or equal to 91.5% for a thickness of 4 mm), for example a soda-lime-silica glass with less than 0.05% of Fe(III) or $Fe_2O_3$, Diamant® glass from Saint-Gobain Glass or Optiwhite® glass from Pilkington or B270® glass from Schott, or a glass of another composition described in the document WO04/025334. It is also possible to choose Planiclear® glass from Saint-Gobain Glass.

The glass of the first and/or second glazing can be neutral (without coloration) or (slightly) tinted, in particular gray or green, such as the TSA glass from Saint-Gobain Glass. The glass of the first and/or second glazing may have undergone a chemical or heat treatment of the hardening or annealing type or a tempering (in particular in order to obtain a better mechanical strength) or be semitempered.

The light transmission $T_L$ can be measured according to the standard ISO 9050:2003 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The curved laminated glazing according to the invention, in particular windscreen or side glazing, can have a $T_L$—in the clear glass area—which is preferably at least 70% and even at least 75% or even at least 80%.

The curved laminated glazing according to the invention, in particular sunroof, can have a light transmission $T_L$ of at most 10% and even of 1% to 6%.

For a motor vehicle roof, at least one, or all, of the following criteria are preferred:
- an energy transmission $T_E$ of at most 10% and even of 4 to 6%,
- an energy reflection RE (preferably face F1 side) of at most 10%, better still of 4 to 5%,
- and a total transmission of the solar energy TTS<30% and even <26%, even from 20 to 23%.

The bending of the first and second glazings (in particular windscreen) can be in one or more directions, for example described in the document WO2010136702.

The area of the main face F1 (windscreen or roof, in particular) can be greater than 1.5 m² and be, for example, less than 3 m².

In order to limit heating in the passenger compartment or to limit the use of air conditioning, one of the glazings at least (preferably the exterior glass) is tinted, and the laminated glazing can also comprise a layer which reflects or absorbs solar radiation, preferably on face F4 or on face F2 or F3, in particular a transparent electrically conductive oxide layer, known as a "TCO layer", (on face F4) or even a stack of thin layers comprising at least one TCO layer, or stacks of thin layers comprising at least one silver layer (on F2 or F3), the or each silver layer being positioned between dielectric layers.

The layer (silver) on face F2 and/or F3 and TCO layer on face F4 can be combined.

A TCO layer (a layer of a transparent electroconductive oxide) may be used for the first or second electrode or on face F4, as described. It is preferably a mixed indium-tin oxide (ITO) layer or a fluorine-doped tin oxide ($SnO_2$:F) layer. Other layers are possible, including thin layers based on mixed indium-zinc oxides (referred to as "IZOs"), based on gallium-doped or aluminum-doped zinc oxide, based on niobium-doped titanium oxide, based on cadmium or zinc stannate, or based on antimony-doped tin oxide. In the case of aluminum-doped zinc oxide, the doping level (i.e., the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%. For layers made of ITO, the thickness will generally be at least 40 nm, indeed at least 50 nm and even at least 70 nm, and often at most 150 nm or at most 200 nm. For layers made of fluorine-doped tin oxide, the thickness will generally be at least 120 nm, indeed at least 200 nm, and often at most 500 nm.

For example, the low-emissivity layer comprises the following sequence: high-index underlayer/low-index underlayer/a TCO layer/optional dielectric overlayer.

A preferred example of low-emissivity layer (protected during a tempering, high-index underlayer (<40 nm)/low-index underlayer (<30 nm)/an ITO layer/high-index overlayer (5-15 nm))/low-index barrier overlayer (<90 nm)/final layer (<10 nm) may be chosen.

Mention may be made, as low-emissivity layer, of those described in the patent US2015/0146286, on the face F4, in particular in examples 1 to 3.

In particular, the face F4 of the laminated glazing is coated with a transparent functional layer, in particular a low-emissivity layer, preferably comprising a TCO layer, including a zone (supplied with electricity and thus an electrode) forming a touch button (for managing the first luminous surface).

It is possible to provide electrical connections with the electrodes. For example, use is made of a first peripheral electroconductive strip (metal, etc.) along the first electrode and a second peripheral electroconductive strip along the second electrode. For example, the first electroconductive strip is along the first lateral or longitudinal edge and the second electroconductive strip is along a second, opposite (lateral or longitudinal) and/or adjacent edge.

Conductive tapes, in particular metal, for example made of copper, and for example at most 2 cm wide, are for example fixed at the periphery to the electrodes (one tape per electrode, the tapes preferably being on opposite edges) for the power supply.

Electrical cables may be fixed (welded, adhesively bonded) to these electroconductive strips.

The device according to the invention may be used in combination with other electrically controllable devices such as those with electroluminescent systems (set of inorganic point-source LEDs, organic diodes or OLED, TFEL (thin film).

Both may be facing or adjacent within a laminated glazing (of the lamination interlayer).

The device according to the invention can be used in particular in a laminated glazing, in combination with another electrically controllable device such as an electroluminescent electrically controllable device, in particular LED, OLED, TFEL.

In one manufacturing example, the liquid crystals are mixed with a monomer (which may be mesogenic) and a small amount of photoinitiator (the liquid crystals serving as solvent), the polymerization is carried out thermally or photochemically (which is quicker, and promotes a polymeric network on the molecular scale).

The invention thus targets a process for producing the electrically controllable device having scattering by liquid crystals particularly as described above, having variable coloring, comprising the following steps:
providing a first electrode, in particular on a dielectric substrate
providing a second electrode, in particular on a dielectric support
providing a mixture comprising:
at least one polymer precursor, such as a monomer, in particular mesogenic or non-mesogenic,
liquid crystals, including at least first liquid crystals, in particular which are non-polymerizable, exhibiting a mesophase P and optionally at least second liquid crystals
preferably, a dichroic dye (mesogenic or non-mesogenic)
if necessary, a polymerization initiator, preferably a photoinitiator
TA being the transition temperature between the mesophase P and the mesophase P' of the mixture, the mixture exhibiting the mesophase P' below TA and the mesophase P starting from TA,
forming a stack of layers comprising, between the first and second electrodes, forming, from said mixture, an electroactive layer made of a material comprising said liquid crystals stabilized by a polymeric network and the dichroic dye (in the dissolved state), said formation comprising, at the temperature Ti less than TA (thus with the mesophase P'), the polymerization, preferably by photopolymerization, preferably under ultraviolet (UV), of said precursor(s), leading to said polymeric network.

The first liquid crystals have only (pure) for example one transition temperature Tp between the mesophase P and the mesophase P'. TA is for example less than or equal to Tp, the polymerization is at the temperature Ti less than TA.

The mesophase P may be a twisted nematic mesophase by adding a chiral agent into the mixture (preferably in phase P' or in phase P). Thus, without chiral agent, the mesophase P of the first liquid crystals may be non-twisted nematic.

The invention targets in particular a process for producing the electrically controllable device having scattering by liquid crystals as described above, having variable coloring, comprising the following steps:
- providing a first electrode, in particular including or coated with a first liquid crystal surface anchoring layer in a first planar, optionally degenerate, orientation, which first electrode is in particular on a dielectric substrate providing a second electrode, in particular including or coated with a liquid crystal surface anchoring layer in a second, in particular planar, degenerate, or normal orientation, which second electrode is in particular on a dielectric support
- providing a mixture comprising:
- at least one polymer precursor (such as a monomer), in particular mesogenic or non-mesogenic
- liquid crystals, including at least first liquid crystals, in particular which are non-polymerizable, exhibiting a mesophase P and a mesophase P' and optionally at least second liquid crystals, the first liquid crystals having a transition temperature Tp between the mesophase P and the mesophase P', TA being the transition temperature between the mesophase P and the mesophase P' of the mixture, which is in particular less than or equal to Tp
- preferably, a dichroic dye (mesogenic or non-mesogenic)
- if necessary, a polymerization initiator, preferably a photoinitiator
- forming a stack of layers comprising between the first and second electrodes, in particular the first and second anchoring layers, forming, from said mixture, an electroactive layer made of a material comprising said liquid crystals stabilized by a polymeric network with a temperature T1 (in particular less than or even equal to Tp) of the mesophase P to the mesophase P', said formation comprising, at the temperature Ti less than TA (thus in mesophase P'), the polymerization, preferably by photopolymerization under UV, of said precursors, leading to said polymeric network.

Preferably, the production process according to the invention may comprise a mesophase P', which is preferably not nematic and which is even smectic, the formation of in particular sub-centimetric domains with two-dimensional topological defects remaining (substantially) in mesophase P.

The defects are formed in particular by one (at least, or as desired) of the following steps:
- preferably, by bringing said mixture into contact with first and second liquid crystal surface anchoring layers
- by applying stresses (between the substrate and the support)
- by applying an electric field in particular an alternating low-frequency field of at most 100 Hz, better still 10 Hz, the mixture comprising charged particles (molecules, etc.).

In particular, said formation of the electroactive layer preferably comprises bringing said mixture into contact with first and second liquid crystal surface anchoring layers, in particular:
- liquid deposition of a layer (dielectric or semiconducting), or providing an element (dielectric or semiconducting) such as a sub-millimeter film connected (adhesively bonded) to the first electrode (or creating a gas gap such as an air gap (for normal anchoring)
- liquid deposition of a layer (dielectric or semiconducting), or providing an element (dielectric or semiconducting) such as a sub-millimeter film connected (adhesively bonded) to the second electrode, or creating a gas gap such as an air gap (for normal anchoring) between the second electrode and the mixture It is possible to provide (beforehand) a surface brushing of the first and/or the second anchoring layer (to form a planar and unidirectional anchoring).

At the temperature T'>T in phase P, the electroactive layer thus exhibits domains with two-dimensional topological defects (and exhibits multiple variable scattering states).

The mixture may be produced in particular by stirring from precursors (monomers) in powder form with thermotropic liquid crystals.

The electroactive layer may be produced using an operation referred to as drip filling or by the capillarity of said mixture.

Preferably, the intensity of the UV lamp is controlled in order to control as well as possible the power received on the exposed surface and therefore the degree of crosslinking, the degree of polymerization.

It is further possible to provide for the first liquid crystals to have a mesophase P' which is smectic and a nematic mesophase P and for the second liquid crystals to have an in particular nematic mesophase and to be devoid of smectic mesophase.

The polymer precursor, such as a monomer, is preferably miscible with the liquid crystal material (not necessarily at all proportions).

The upper limit will depend on the liquid crystal+monomer mixture (solubility limit which will depend, moreover, for a given mixture, on the temperature and the nature of the liquid crystal phase of this mixture).

The process may comprise a step of lamination of said stack which is, in particular:
- substrate (flexible, polymeric, PET, UTG, etc.)/first electrode/(first anchoring layer/)electroactive layer/(second anchoring layer/)second electrode/support (flexible, polymeric, PET, UTG, etc.)
- or even first electrode/first anchoring layer, forming substrate/electroactive layer/second anchoring layer, forming support/second electrode this being between two glass sheets, in particular curved glass sheets, by means of a polymeric, in particular thermoplastic, lamination interlayer, for example PVB or EVA, which lamination interlayer comprising one or more sheets, in particular lamination at a temperature of at most 140° C. and even 120° C., 110° C.

It is therefore possible to provide a lamination. In order to form a laminated glazing with said stack (plastic or glass, for example flexible, support and substrate) between two glass sheets (for example of thickness from 0.7 mm to 5 mm), use may be made of:
- three sheets (PVB, EVA, PU, etc., monolayer or multilayer), in particular two solid sheets each in contact with one of the two glazings and a central sheet with a reserve for housing the stack
- two sheets (PVB, EVA, PU, etc., monolayer or multilayer), especially if the stack is thin enough for the two sheets to come together by creeping on either side of the stack.

PVB is preferred in vehicles.

One of the sheets of glass may be tinted.

Conventionally, the lamination comprises placing under vacuum—by any suction means—, heating, and optional pressurization. Oven or autoclave are used.

Thus, the lamination may comprise degassing, sealing the edge, and involves implementing suitable temperatures and pressures in the conventional way, during the autoclaving, the sheet such as PVB is brought to a relatively high temperature (greater than 100° C. for PVB, often between 90° C. and 140° C.), which will soften it and enable it to flow. In the case of using several sheets, in particular PVB, a noteworthy phenomenon then occurs: the interfaces of the different PVBs will disappear, the PVB will in a certain way heal itself so as to form, at the end of autoclaving, just one homogeneous and continuous film.

Under the usual conditions of assembly of a laminated glazing, combining heating, placing under negative pressure (vacuum) of the inside of the laminated glazing aims to evacuate the air present between the different constituents (rough and uneven surface of the lamination interlayer before heating), and optionally the application of pressure to the outside of the laminated structure is carried out in order to promote the adhesive bonding and long-lasting cohesion of the assembly.

Other details and features of the invention will become apparent from the following detailed description given in relation to the following appended drawings, and in which:

FIG. 1 shows a schematic cross sectional view of a device having variable scattering and coloring by liquid crystals and dichroic dye 100 in a first embodiment of the invention.

FIG. 2*a* shows a schematic cross sectional detail view of an electroactive layer of the device having variable scattering and coloring by liquid crystals of the type from FIG. 1, when no electric field is applied or under electric field, FIG. 2*b* schematically illustrating the orientation of some liquid crystals with or without electric field, FIG. 2*c* schematically illustrating the orientation of some liquid crystals and of some dichroic dyes with or without electric field.

FIGS. 3*a*, 4, 5, 6 and 7 show images (in black and white) of the electrically controllable device 100 of FIG. 1 in a front view (example 1) in a light box with a background 120 (paper with the LOGO and the letters SAINT-GOBAIN) at 20 cm and under illuminant D65 in the absence of an electric field (3*a*), for an electric field normal to the electroactive layer with a voltage of 5 V (4), 10 V (5), 20 V (6), and back to 0 V (7).

FIG. 3*b* shows a front view of an image (in black and white) obtained by polarized light optical microscopy (PLM) under polarizer with a magnification of 20× (with a 20 µm scale shown in white) of the electroactive layer of the electrically controllable device 100 of FIG. 1 (example 1) in the absence of an electric field.

FIGS. 8*a* to 8*e* show the same images as FIGS. 3*a*, 4, 5, 6 and 7, but in color.

FIG. 9 shows a set I of curves corresponding to the total transmission TT based on the wavelength between 380 and 780 nm without electric field or under electric field normal to the electroactive layer with a voltage of 1.3 V to 30 V and a set of curves J corresponding to the diffuse transmission DT based on the wavelength between 380 and 780 nm without electric field or under electric field normal to the electroactive layer with a voltage of 1.3 V to 30 V for the device 100 of FIG. 1 (example 1).

FIG. 10 shows a set K of curves corresponding to the total reflection TR based on the wavelength between 380 and 780 nm without electric field or under electric field normal to the electroactive layer with a voltage of 2.5 V to 30 V for the device 100 of FIG. 1 (example 1).

FIG. 11 shows a set L of curves corresponding to the absorption A based on the wavelength between 380 and 780 nm without electric field or under electric field normal to the electroactive layer with a voltage of 2.5V to 30 V for the device 100 of FIG. 1 (example 1) and the absorption curve of the vacuum cell with ITO electrodes without electric field or under electric field with a voltage of 2.5 V to 30 V.

FIG. 12 shows a set of curves corresponding to:
the integrated light transmission $L_T$ based on the electric field between 0 V and 30 V for the device of the type from FIG. 1 (example 1)
the haze H which is the ratio between the integrated light transmission associated with the diffuse transmission DT and $L_T$, based on the electric field between 0 V and 30 V for the device of the type from FIG. 1 (example 1)
the (integrated) light reflection LR based on the electric field between 0 V and 30 V for the device of the type from FIG. 1 (example 1)
the (integrated) light absorption LA based on the electric field between 0 V and 30 V for the device of the type from FIG. 1 (example 1) FIG. 13 shows a set of curves corresponding to:
the relative difference in % of the (integrated) light transmission LT based on the electric field between 0 V and 30 V for the device of the type from FIG. 1 (example 1)
the relative difference in % of the haze H based on the electric field between 0 V and 30 V for the device of the type from FIG. 1 (example 1)
the relative difference in % of the (integrated) light reflection LR based on the electric field between 0 V and 30 V for the device of the type from FIG. 1 (example 1)
the relative difference in % of the (integrated) light absorption LA based on the electric field between 0 V and 30 V for the device of the type from FIG. 1 (example 1).

FIGS. 14*a* to 14*c* show images (in black and white) obtained by polarized light optical microscopy (PLM) between polarizer and analyzer, crossed, under a magnification of 20× (with a 100 µm scale marked in white), which image showing the domains with line defects of the electroactive layer of the electrically controllable device of FIG. 1 (example 2) in the absence of electric field (14*a*), for an electric field normal to the electroactive layer with a voltage of 5 V (14*b*), of 30 V (14*c*).

FIG. 15 shows a set I' of curves corresponding to the total transmission TT based on the wavelength between 380 and 780 nm without electric field or under electric field normal to the electroactive layer with a voltage of 2.5 V to 50 V and a set of curves J corresponding to the diffuse transmission DT based on the wavelength between 380 and 780 nm without electric field or under electric field normal to the electroactive layer with a voltage of 2.5 V to 50 V for the device 100 of FIG. 1 (example 2).

FIG. 16 shows the (integrated) light transmission LT and the hazes based on the voltage, from 0 to 50 V, for examples 1 and 2, respectively.

FIGS. 17 to 22 show images (in black and white) obtained by polarized light optical microscopy (PLM) under polarizer (no analyzer), with X axis at different orientations under a magnification of 20× (with a 100 µm scale marked in white), which image showing the domains defined by line defects of the electroactive layer of the electrically controllable device of FIG. 1 in the absence of electric field (FIGS. 17, 18, 19), for an electric field normal to the electroactive layer (FIGS. 20, 21, 22) at 25 V.

FIG. 23 shows a schematic sectional view of a device having variable scattering and coloring by liquid crystals and dichroic dye 200 in a second embodiment of the invention.

FIGS. 24*a*, 24*b*, 24*c*, 24*d* show images (in black and white) obtained by polarized light optical microscopy (PLM) between polarizer and analyzer, crossed, under a magnification of 20 (with a 50 μm scale marked in black), of the domains defined by line defects of the electroactive layer of the electrically controllable device of FIG. 23 (example 3) in the absence of electric field (24a), for an electric field normal to the electroactive layer with a voltage of 20 V (24b), 30 V (24c), 40 V (24d).

FIGS. 25 to 29 show images (in black and white) obtained by polarized light optical microscopy (PLM) under polarizer at different orientations and without analyzer under a magnification of 20× (with a 50 μm scale marked in white), of the domains defined by line defects of the electroactive layer of the electrically controllable device of FIG. 1:
  in the absence of electric field (FIGS. 25, 26, 27), respectively with X normal, at 45°, or parallel to the brushing direction
  for an electric field normal to the electroactive layer with a voltage of 10 V (FIG. 28), 40 V (FIG. 29), with X parallel to the brushing direction.

FIG. 32 shows a schematic cross sectional view of a device having variable scattering and color by liquid crystals and dichroic dye 500 in a fifth embodiment of the invention.

FIGS. 33 and 34 show, respectively, a front view and a schematic cross sectional view of a device having variable scattering and coloring by liquid crystals and dichroic dye 600 in a sixth embodiment of the invention.

FIG. 35 shows a schematic cross sectional view of a device having variable scattering and color by liquid crystals and dichroic dye by liquid crystals 700 in a seventh embodiment of the invention.

The elements shown in the figures are not to scale.

Figure 1:
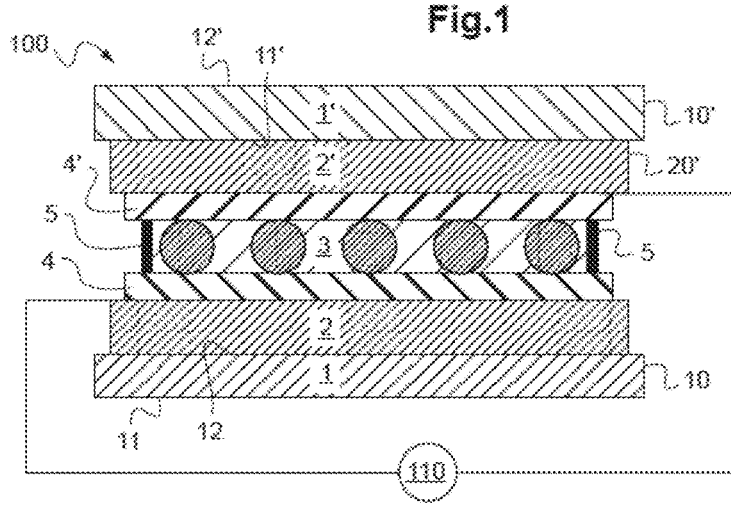

FIG. 1 shows an electrically controllable device having variable scattering and coloring 100 by liquid crystals and dichroic dye according to the invention, which comprises a stack of layers in this order:
  a transparent dielectric substrate 1 with an edge face 10 and main faces 11 and 12 and comprising a first transparent electrode 2 with a first main surface referred to as connecting surface and a surface referred to as opposite surface Sb, and an edge face 10, here a glass of 1.1 mm—or as a variant, plastic, such as PET—with a layer of ITO with sheet resistance of 100 ohm/square, more broadly between 5 and 300 ohm/square, and for color neutrality, this electrode or each electrode may also comprise at least two dielectric thin underlayers under the ITO layer and even one or two (dielectric) overlayers
  a first transparent planar anchoring layer 4 (in this case, degenerate), on the first electrode 2
  in contact with the first anchoring layer 4, a colored dielectric electroactive layer 3 with a main face referred to as connecting surface-side face and a main face referred to as opposite face A2, herein of thickness E0 (less than 20 μm) made of a material comprising
  liquid crystals
  polymers forming a polymeric network, the liquid crystals being stabilized by the polymeric network,
  one or more dichroic dyes (in the dissolved state) the material exhibiting, from a temperature referred to as T1, a mesophase referred to as P, wherein the material comprises a set of domains, herein sub-millimetric domains which comprise two-dimensional topological defects such as line defects and under T1 a mesophase P'
  spacers being distributed in the material, herein glass beads
  the layer being sealed at the periphery by a polymeric seal 5 for example made of epoxy acrylate, herein of cyanoacrylate
  a second transparent anchoring layer 4', herein normal anchoring
  a second transparent electrode 2' with, on face A2 side, a main surface referred to as second connecting surface and with a surface referred to as opposite surface Sc, in particular which second electrode is an ITO layer with a sheet resistance of 100 ohm/square, more broadly between 5 and 300 ohm/square, and, for color neutrality, this or each electrode may also comprise at least two dielectric thin underlayers under the ITO layer and even one or two overlayers
  a transparent dielectric support 1' of the second electrode 2' with an edge face 10' and main faces 11' and 12', herein a glass of 1.1 mm—or as a plastic variant, such as PET- For the power supply via a source 110, conductive tapes (not shown in FIG. 1), in particular metal conductive tapes, for example made of copper, are fixed by adhesive bonding along and on the peripheral edges and are in contact with the electrodes 2, 2' (one tape per electrode, the tapes being preferably on opposite edges). These tapes are then connected to a power supply.

The edge faces 20, 20' of the electrodes 2, 2' and the edge of the electroactive layer are preferably set back relative to the edges 10, 10' of the glasses 1, 1'.

The glasses 1, 1' are rectangular but may be of any shape, for example round, square, and of any dimension, for example of a length of at least 1 m and even of a width of at least 10 cm (strip, etc.). The thicknesses may for example be from 0.7 mm to 4 mm. They may be of a thickness preferably of greater than 100 μm and of at most 300 μm for better mechanical strength of the assembly and/or ease of use and handling, but if more flexibility is desired, it is possible to go down for example to 50 μm.

In the "OFF" state, i.e. before an electric voltage is applied, this glazing having liquid crystals 100 is scattering, i.e. it transmits optically but is not transparent and is colored with a given color C0. As soon as a voltage is applied between the two electrodes, the layer 3 moves into the less scattering state with the separate color C1 with a variable level of scattering and color which depends on the voltage.

Under said electric field, which is preferably alternating, the stack has a diffuse transmission and a haze which vary with the voltage, in the same way that the absorption varies with the voltage.

In an alternative to the choice of ITO alone or in a multilayer, a stack containing silver is chosen for one or both electrodes. It is even possible to choose, for one of the electrodes, a layer with a lower LT or even a reflective layer.

One of, or the external faces of the first and second bearing substrates 1, 1' may comprise one or more functional layers (anti-reflective, etc.) which are already known.

One of the first and second bearing substrates 1, 1', and even the associated electrode, can be of larger dimensions than the rest of the stack. For example, the electroconductive layer 2 or 2' such as ITO (or other) may serve as solar control layer. The ITO zone serving as electrode can then be insulated by laser etching, for example, to form an ITO strip.

The one and/or the other of the glasses 1, 1' may be replaced by a polymer sheet, for example PET, of at most 500 µm or 200 µm with or without a layer on the external face thereof or else by a plastic sheet—with or without a layer on the external face thereof—for example which is thicker (such as 1 to 10 mm), a polycarbonate or else a PMMA.

The two examples which follow illustrate the production of layers with focal conic domains (FCD) through the choice of the anchoring layers 4 and 4'.

EXAMPLE 1

The production process is described more precisely below.

The first anchoring layer 4 is a layer of polyvinyl alcohol (PVA; Sigma-Aldrich; molecular weight $M_w \sim 27$ kDa) of approximately 1 µm, causing degenerate planar surface anchoring of the liquid crystals (no field) in contact with this layer 4.

The layer of PVA 4 is deposited on the first ITO layer 2 by spin coating a solution of PVA in deionized water (9.1% by weight of PVA). Before the deposition, the ITO is rinsed with ethanol and dried under nitrogen.

The second anchoring layer 4' is an octyltrichlorosilane (OTS) layer, causing normal (homeotropic) surface anchoring of the liquid crystals (with no electric field applied) in contact with this layer 4'. It is obtained by submerging the glass with the second ITO 2' in a 10 nM OTS solution in n-heptane for 30 minutes, rinsing in deionized water and drying under nitrogen.

Under said electric field, the stack of example 1 will exhibit a diffuse transmission, a haze and a color which vary with the voltage up to 30 V.

The colored layer of liquid crystals 3 is composed of a mixture comprising a blue dichroic dye named M412, sold by Mitsui Chemicals, having the maximum absorption wavelength of 630 nm±10 nm and, as wavelength outside the absorption band, 430 nm±50 nm or ±10 nm. The layer 3 is polymerized using a monomer, herein mesogenic, forming the stabilizing polymeric network, such as 1,4-bis [4-(3-acryloyloxy)xyloxy) benzoyloxy]-2-methylbenzene ST03021 (sold by Synthon Chemicals) of formula $C_{33}H_{32}O_{10}$.

Use is made of a mixture of liquid crystals composed of 4-octyl cyanobiphenyl (8CB from Tokyo Chemicals) and E7 (sold by Synthon Chemicals), well-known liquid crystals of formula $C_xH_yO_zN_w$.

More precisely, to produce the colored electroactive layer 3, a mixture is formed with these two types of liquid crystals, 8CB and E7, the monomer, the dichroic dye, and a photoinitiator 2,2-dimethoxy-2-phenylacetophenone, DPMA.

The mixture contains:
- 95.5% by weight of liquid crystals E7 and 8CB, in the ratio 1:1.38;
- 1.95% by weight of monomer ST03021,
- 0.6% by weight of photoinitiator DPMA,
- 1.95% by weight of dichroic dye M412.

The mixture E7/8CB hereinbefore exhibits a smectic A mesophase P' under a temperature of approximately 17±1° C. and a nematic mesophase P between approximately 17±1° C. and approximately 48±1° C. (and an isotropic phase beyond approximately 48±1° C.).

The final mixture (after polymerization) exhibits a smectic A mesophase P' under a modified temperature T1 of approximately 15±1° C. with nematic mesophase P.

A layer of this colored mixture is formed over a thickness of approximately 10 µm between the anchoring layers 4 and 4'.

Next, the assembly is illuminated under UV (A=365 nm) for polymerization at 5° C. (or at least under 17.1° C.), therefore in smectic A phase.

The colored electroactive layer 3 then comprises, in nematic phase, domains which are comparable to the focal conic domains of the smectic A phases, in particular herein toric focal conic domains, or TFCD.

Under said electric field, the stack of example 1 will exhibit a diffuse transmission, a haze and a color which varies with the voltage up to 30 V (see FIG. 16) under 1 kHz alternating electric field. The results are similar at 100, 500 Hz.

EXAMPLE 2

In a second example, the stack differs in that the colored active layer is 15 µm.

Moreover, the monomer is different; it is bisphenol A dimethacrylate (non-mesogenic monomer), referred to as BAD.

The following percentages by weight can be specified:
- E7/(E7+8CB)=42% by weight;
- BAD/(BAD+8CB+E7)=2% by weight;
- M412/(M412+8CB+E7)=2% by weight;
- DMPA/(DMPA+BAD)=25% by weight.

Under said electric field, the stack of example 2 will exhibit a diffuse transmission, a haze and a color which vary with the peak voltage Vpeak up to 50 V (see FIG. 16) under 1 kHz alternating electric field. The results are similar at 100, 500 Hz.

The mixture of the two pure liquid crystals E7/8CB hereinbefore exhibits a smectic A mesophase P' under a temperature of approximately 17±1° C. and a nematic mesophase P between approximately 17±1° C. and approximately 48±1° C. (and an isotropic phase beyond approximately 48±1° C.). The final mixture after polymerization exhibits a smectic A mesophase P' under a modified temperature T1 equal to 16±1° C. with nematic mesophase P.

Figure 2A:
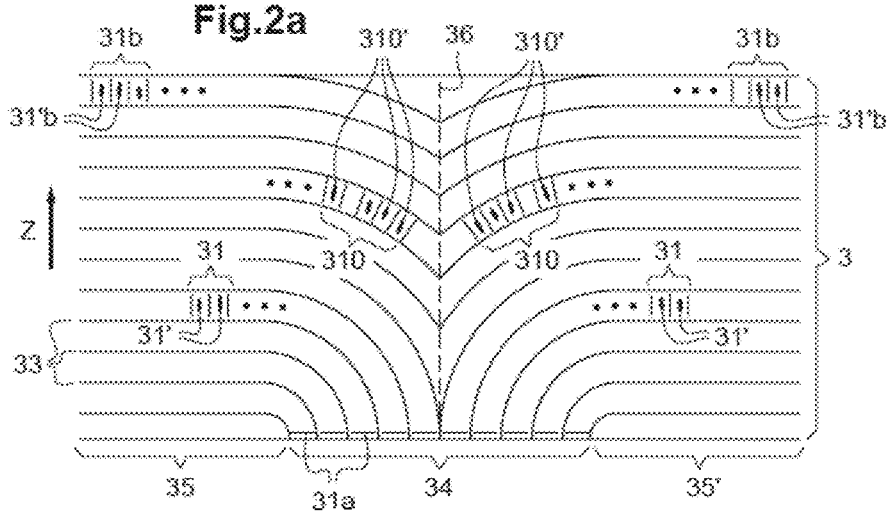
Figure 2B:
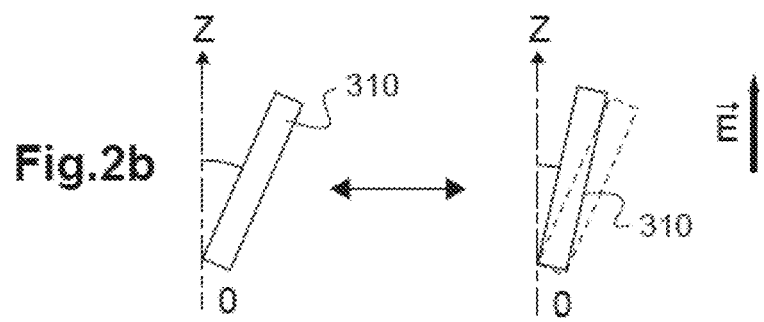
Figure 2C:
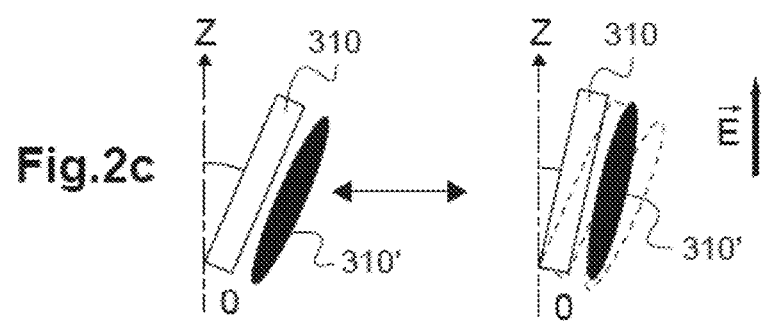

FIG. 2a shows a schematic cross sectional detail view of a colored electroactive layer of the device having variable scattering and coloring by liquid crystals of the type from FIG. 1, when no electric field is applied or under electric field, FIG. 2b schematically illustrating the orientation of some liquid crystals 310 without electric field (left-hand part of FIG. 2b) or under electric field E (right-hand part of FIG. 2c), FIG. 2c schematically illustrating the orientation of some liquid crystals and of some dichroic dyes controlled by the liquid crystals without electric field (left-hand part of FIG. 2c) or under electric field (right-hand part of FIG. 2c).

The layer 3 in nematic phase P exhibits smectic defects of TFCD type (remaining from the phase P').

FIG. 2a is considered to represent a single focal conic domain of TFCD type.

FIG. 2a shows a structure in layers 33 of liquid crystals 31, 31a, 31b, 310 with dichroic dyes 31', 31'b, 310', the structure fixed by the polymeric network not shown.

The layers of liquid crystals are curved toward the planar anchoring layer (herein degenerate) in a central zone 34 and the layers are planar and parallel to one another in two lateral zones 35, 35' which are more or less spread apart and which may be non-existent.

The focal conic domain (FCD) exhibits a line defect in the plane of the glass 1 like a surface with a closed contour of circular type (more or less uneven), herein the limit of the central zone 34, and another line defect which has a linear geometry 36 perpendicular to the layer 3.

On the side of the planar anchoring layer (lower part), some liquid crystals (rods) 31a are parallel to this layer along all the directions of the plane). The same applies to some dichroic dyes (rod-shaped) present in this zone.

On the size of the normal anchoring layer (upper part), some liquid crystals 31b are perpendicular to this anchoring layer. The same applies to some dichroic dyes (rod-shaped) 31b (the long axis of the molecule 31b may be more or less normal to the normal anchoring layer).

Outside the contact zone with the planar anchoring layer 4 (when no electric field is applied), and below this zone, for example in the middle of the thickness of the layer 3, the liquid crystals 310 are oriented normal to the anchoring layers. The same applies to some dichroic dyes (rod-shaped) 31' (the long axis of the molecule 31' may be more or less normal to the normal anchoring layer).

For example, the liquid crystals have a first orientation at an oblique angle relative to the Z axis (to the vertical field E) when no electric field is applied in the curved zone, which then comes closer to the Z axis (of the field E) when the field is applied (cf. FIG. 2b).

Without electric field (left-hand part of FIG. 2c), the liquid crystals 310 have a first orientation at an oblique angle relative to the Z axis (to the vertical field E) and the dichroic dyes 310' also have a given orientation (more or less parallel to the liquid crystals).

With the alternating electric field E (cf. right-hand part of FIG. 2c), since the liquid crystals 310 (by rotation) come closer to the Z axis (tending to be aligned with the field E) and the movement (rotation) of dichroic dyes 310' is controlled by the movement of the liquid crystals, the latter 310' also come closer to the Z axis (tend to align with the field E).

FIGS. 3a, 4, 5, 6 and 7 show images (in black and white) of the electrically controllable device of FIG. 1 with the layer 3 in a front view, (example 1) in a light box with a background 120 (paper with the LOGO and the letters SAINT-GOBAIN) at 20 cm and under illuminant D65 in the absence of an electric field (FIG. 3a), for an electric field normal to the electroactive layer 3 with a voltage of 5 V (FIG. 4), 10 V (FIG. 5), 20 V (FIG. 6), and back to 0 V (FIG. 7). The temperature is 21° C., therefore in nematic phase with smectic A defects.

In a zone with the layer 3, the decrease in haze and color with the increase in peak voltage Vpeak is observed under 1 kHz alternating field by virtue of an electrical connection 110. The letters and the logo 120 are increasingly distinguished from one another.

Figure 3A:
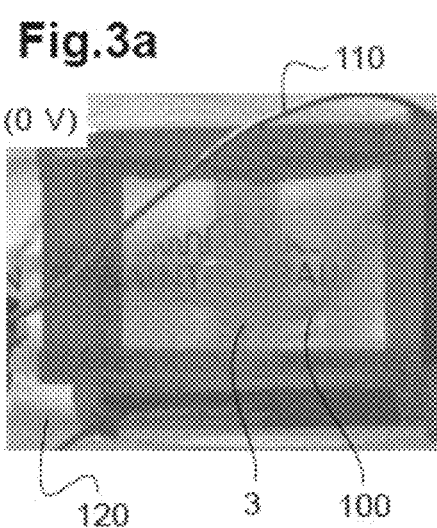
Figure 5:
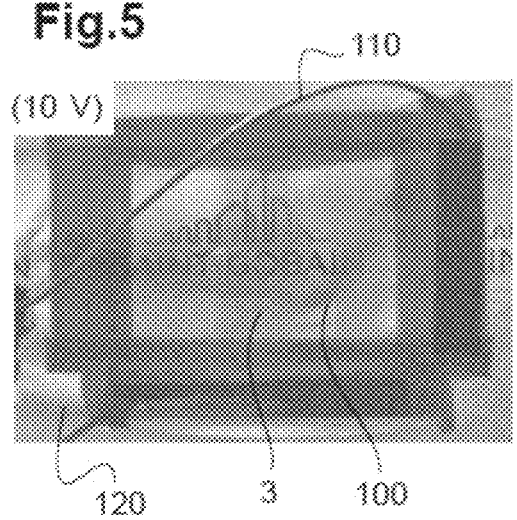
Figure 6:
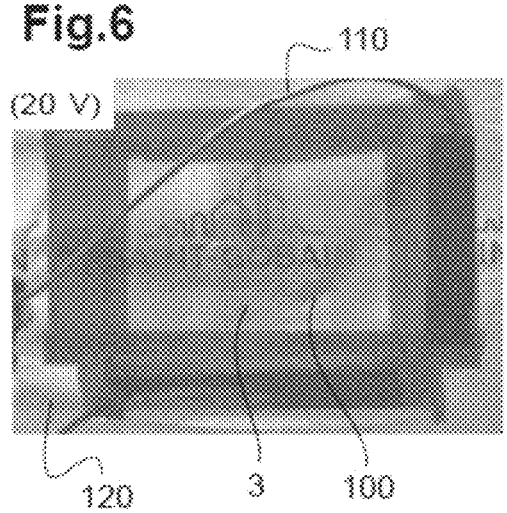

FIGS. 3a and 7 demonstrate the reversibility of the most scattering and colored state without electric field.

FIGS. 8a to 8e show the same images as FIGS. 3a, 4, 5, 6 and 7, but in color.

FIG. 3b shows an image (in black and white) obtained by polarized light optical microscopy (PLM) under polarizer with a magnification of 20× (with a 20 μm scale shown in white), which image showing the domains defined by the line defects of the electroactive layer of the electrically controllable device 100 of FIG. 1 (example 1) in the absence of an electric field. The temperature is 21° C.

The domains are characterized by polarized light optical microscopy, referred to as PLM; on said PLM image, each domain is defined by a surface referred to as visible surface, SD. A black circle surrounds an FCD domain.

The domains are of polydisperse contours.

The more the voltage is increased, the better the writing 120 can be made out.

In order to measure the color variation, the lightness L* and the parameters a* and b* in this example 1 are calculated, as is the color difference deltaE. Use is made of a spectrometer of Perkin Elmer Lambda 900 type. L0* is the value at 0 V.

The measurements and calculations are listed in table 1.

TABLE 1

| Peak voltage (V) | L* | a* | b* | L* − L0* | deltaE |
|---|---|---|---|---|---|
| 0 | 76.9 | −6.5 | −23.5 | — | — |
| 1.3 | 77.6 | −6.4 | −22.4 | 0.7 | 1.3 |
| 2.5 | 79.2 | −6.4 | −19.7 | 2.3 | 4.5 |
| 5 | 81.0 | −6.1 | −17.2 | 4.1 | 7.5 |
| 10 | 82.0 | −5.9 | −16.0 | 5.1 | 9.1 |
| 15 | 82.2 | −5.8 | −15.6 | 5.3 | 9.5 |
| 20 | 82.3 | −5.8 | −15.4 | 5.4 | 9.7 |
| 30 | 82.4 | −5.7 | −15.3 | 5.5 | 9.9 |

Lightness increases with voltage; a* is stable and b* increases. DeltaE increases with voltage.

FIG. 9 shows a set I of curves corresponding to the total transmission TT based on the wavelength between 380 and 780 nm without electric field or under alternating electric field normal to the electroactive layer with a peak voltage of 1.3 V to 30 V and a set of curves J corresponding to the diffuse transmission DT based on the wavelength between 380 and 780 nm without electric field or under alternating electric field normal to the electroactive layer with a peak voltage of 1.3 V to 30 V for the device 100 of FIG. 1 (example 1).

The total transmission TT (curves I) outside the absorption band of the dichroic dye, hence over the wavelength range from 380 nm to 400 nm and 700 to 2500 mn (infrared is not shown) and is (virtually) independent of the switching voltage.

The total transmission TT is virtually independent of the voltage outside this absorption band of the dichroic dye.

It is possible to reduce the absorption, in particular caused by the ITO layers.

On the other hand, outside the absorption band of the dichroic dye, it is indeed observed that the diffuse transmission DT (curves J) varies and decreases gradually as the voltage increases. Therefore, it has indeed been quantitatively shown that the diffuse transmission is adjustable with the voltage. For example, DT goes from more than 40% to approximately 10% at 480 nm, when going from 0 V to 30 V.

In the zone of the absorption band of the dichroic dye, the total transmission TT increases with the voltage (going from approximately 40% to approximately 50% at 600 nm).

FIG. 10 shows a set K of curves corresponding to the total reflection TR based on the wavelength between 380 and 780 nm without electric field or under alternating electric field normal to the electroactive layer with a peak voltage of 2.5 V to 30 V for the device 100 of FIG. 1 (example 1).

It is observed that the reflection TR is virtually independent of the voltage and is less than 10% from 400 nm.

FIG. 11 shows a set L of curves corresponding to the (total) absorption A based on the wavelength between 380 and 780 nm without electric field or under electric field normal to the electroactive layer with a voltage of 2.5V to 30 V for the device 100 of FIG. 1 (example 1) and the absorption curve of the vacuum cell with ITO electrodes without electric field or under electric field normal to the vacuum cell with a voltage of 2.5 V to 30 V.

The absorption A of the ITO electrodes is constant in the visible range, while the absorption A drops with the voltage in the absorption band of the dichroic dye, for example at 600 nm it goes from more than 50% to 40%. Outside of the absorption band, the absorption A is virtually independent of the voltage.

FIG. 12 shows a set of curves corresponding to:
- the integrated light transmission $L_T$ based on the alternating electric field for a peak voltage between 0 V and 30 V for the device of the type from FIG. 1 (example 1)
- the haze H which is the ratio between the integrated light transmission associated with the diffuse transmission DT and $L_T$, based on the alternating electric field for a peak voltage between 0 V and 30 V for the device of the type from FIG. 1 (example 1)
- the (integrated) light reflection LR based on the alternating electric field for a peak voltage between 0 V and 30 V for the device of the type from FIG. 1 (example 1)
- the (integrated) light absorption LA based on the alternating electric field for a peak voltage between 0 V and 30 V for the device of the type from FIG. 1 (example 1)

It is observed that $L_T$ increases then is virtually independent of the voltage from 5 V, is approximately 60%.

It is observed that LR is virtually independent of the voltage from 2 V, is approximately 9%.

It is observed that LA drops then is virtually independent of the voltage from 2 V, is approximately 32%.

LT increases with voltage because the absorption LA decreases due to the gradual reorientation of an increasingly large fraction of the dyes with their long axis parallel to the applied electric field, LR furthermore remaining virtually constant.

However, haze decreases greatly.

FIG. 13 shows a set of curves corresponding to:
- the relative difference in % of the integrated light transmission $L_T$ based on the alternating electric field for a peak voltage between 0 V and 30 V for the device of the type from FIG. 1 (example 1), which goes up to 20%
- the relative difference in % of the haze H based on the alternating electric field for a peak voltage between 0 V and 30 V for the device of the type from FIG. 1 (example 1), which goes up to −80%
- the relative difference in % of the (integrated) light reflection LR based on the alternating electric field for a peak voltage between 0 V and 30 V for the device of the type from FIG. 1 (example 1), which goes up to 10%
- the relative difference in % of the (integrated) light absorption LA based on the alternating electric field for a peak voltage between 0 V and 30 V for the device of the type from FIG. 1 (example 1), which goes up to more than −20%.

Figure 14A:
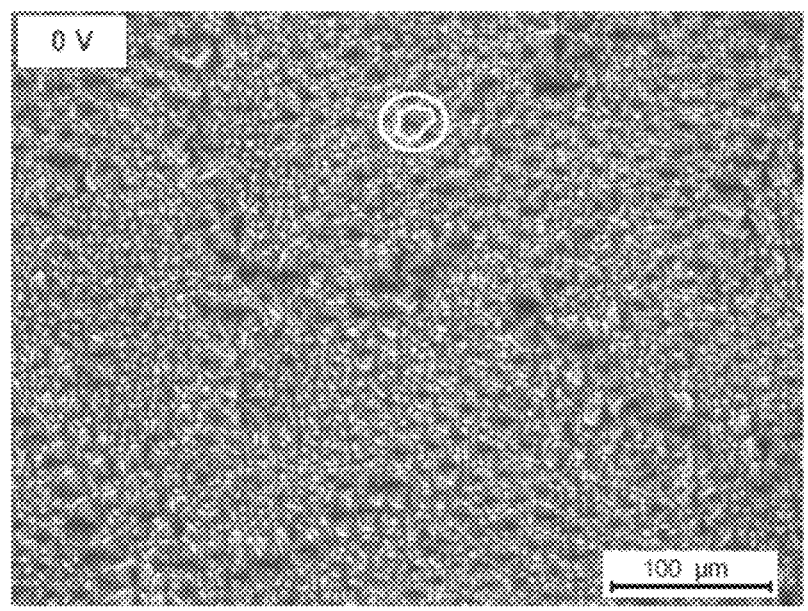
Figure 14B:
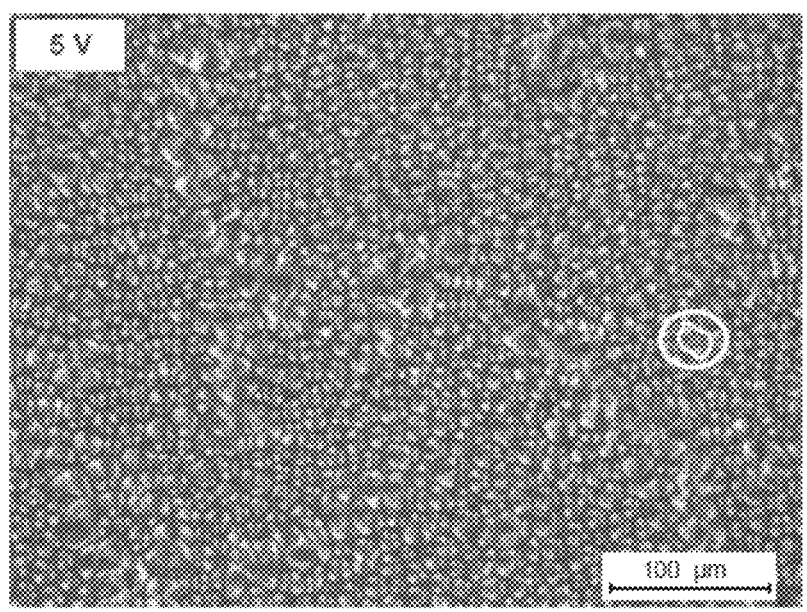
Figure 14C:
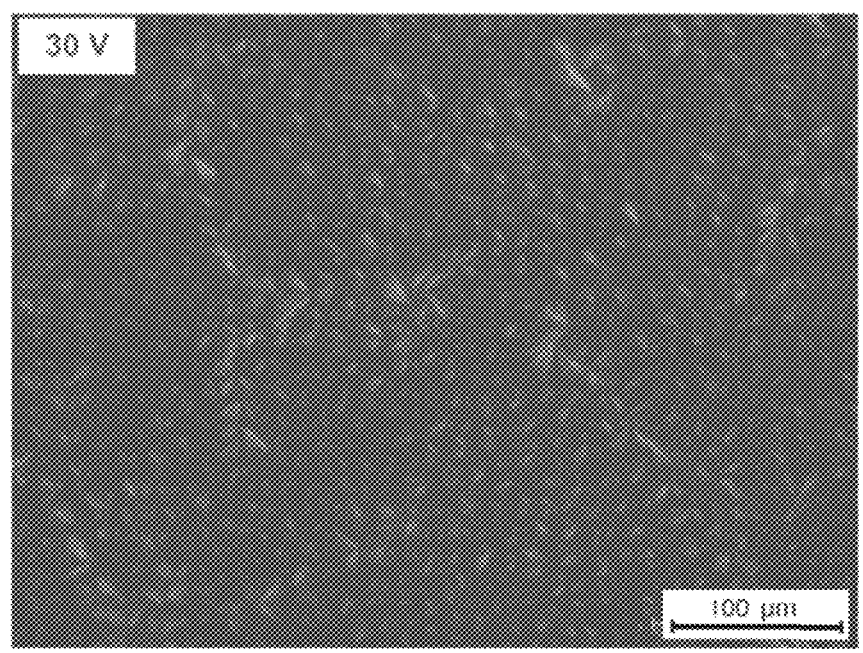

FIGS. 14a to 14c show images (in black and white) obtained by polarized light optical microscopy (PLM) between polarizer and analyzer, crossed, under a magnification of 20× (with a 100 μm scale marked in black), which image showing the domains with line defects of the electroactive layer of the electrically controllable device of FIG. 1 (example 2) in the absence of electric field (FIG. 14a), for an electric field normal to the electroactive layer with a voltage of 5 V (FIG. 14b), of 30 V (FIG. 14c).

The images become increasingly dark between crossed polarizer and analyzer with the increase in voltage, since more and more liquid crystals are oriented parallel to the electric field when the voltage increases, which is reflected in a decrease in the apparent size of the domains which have a multilobal form which appears to shrink.

Figure 15:
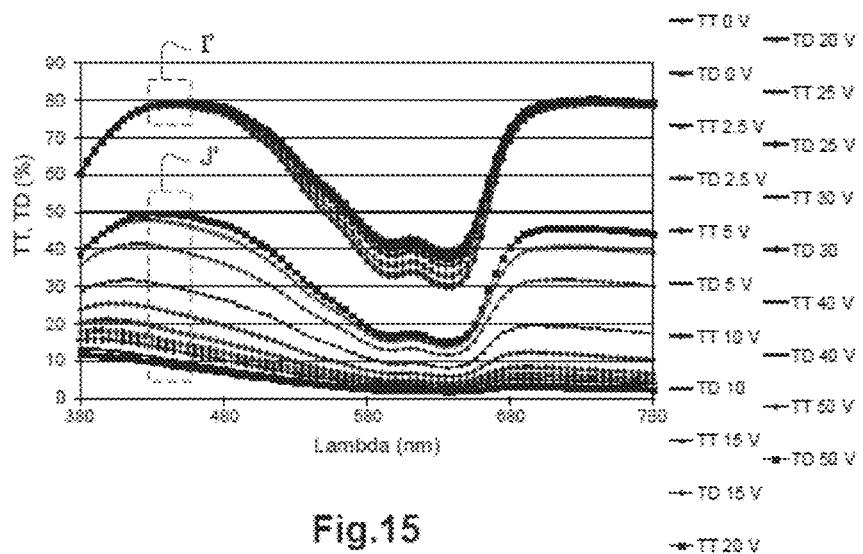

FIG. 15 shows a set of curves I' of curves corresponding to the total transmission TT based on the wavelength between 380 and 780 nm without electric field or under electric field normal to the electroactive layer with a peak voltage of 2.5 V to 50 V and a set of curves J' corresponding to the diffuse transmission DT based on the wavelength between 380 and 780 nm without electric field or under electric field normal to the electroactive layer with a peak voltage of 2.5 V to 50 V for the device 100 of FIG. 1 (example 2).

The observations are similar to those of FIG. 9 (example 1).

Figure 16:
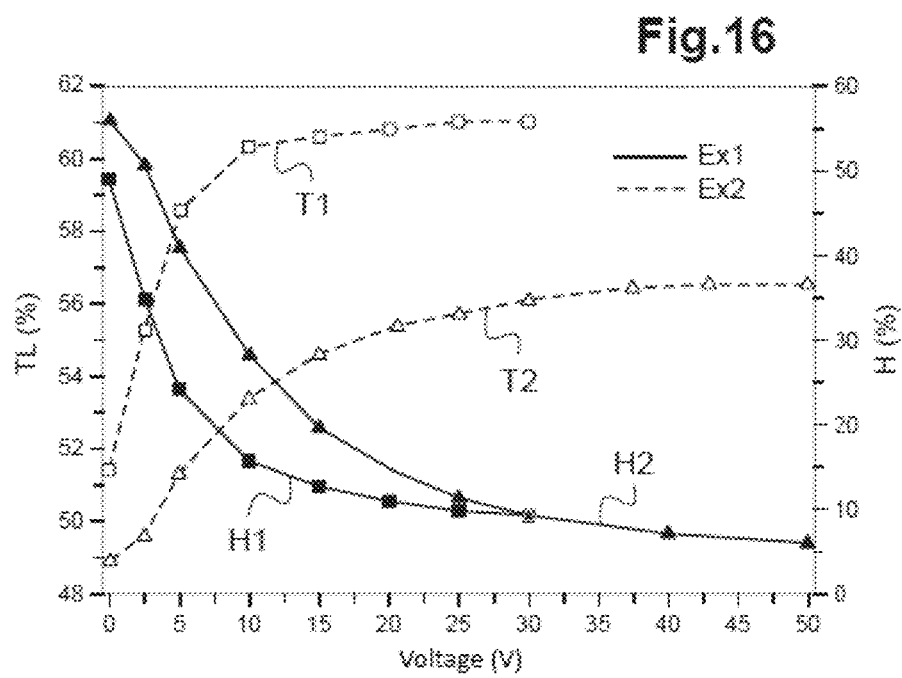
Figure 17:
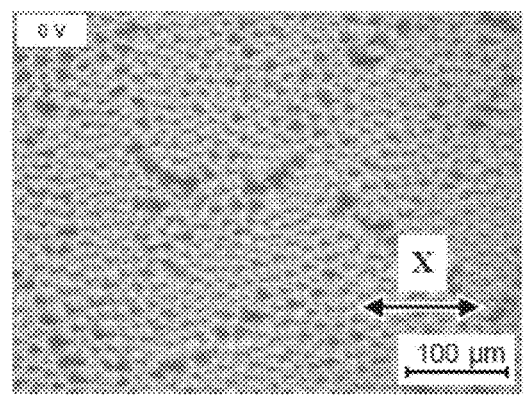
Figure 18:
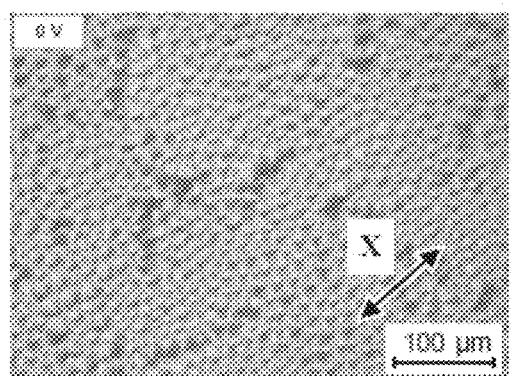
Figure 19:
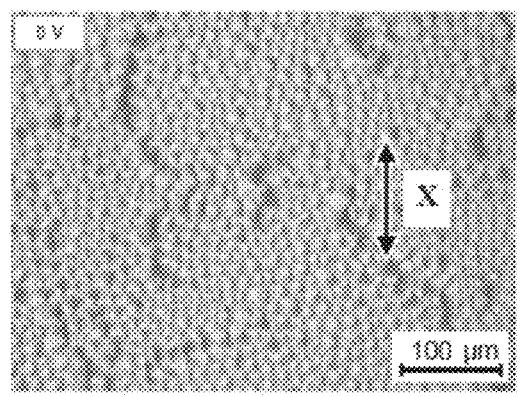
Figure 20:
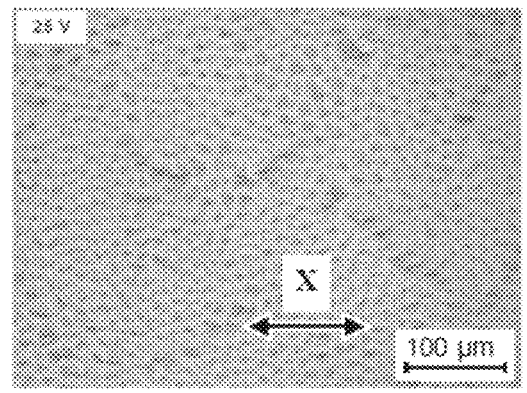
Figure 21:
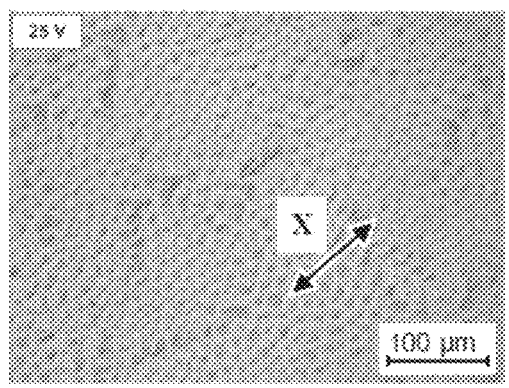
Figure 22:
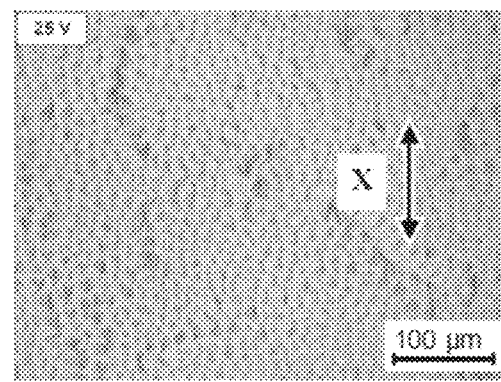

FIG. 16 shows the (integrated) light transmission LT, referred to as T1 and T2, and the haze H1 and H2 based on the voltage, from 0 to 50 V, for examples 1 and 2, respectively.

The shapes of the curves T1 and T2 or H1 and H2 are similar. More voltage is used for example 2, in particular because the layer of liquid crystals is thicker.

FIGS. 17 to 22 show images (in black and white) obtained by polarized light optical microscopy (PLM) under linear polarizer (no analyzer), with X axis at different orientations under a magnification of 20× (with a 100 μm scale marked in black on a white background), which image showing the domains defined by line defects of the electroactive layer of the electrically controllable device of FIG. 1 (example 2) in the absence of electric field (FIGS. 17, 18, 19), for an electric field normal to the electroactive layer (FIGS. 20, 21, 22) at 25 V.

The defect domains are of TFCD type (implying a degenerate planar anchoring layer and a normal anchoring layer, as already described), it is observed that only the dichroic dye molecules oriented on average along the X axis of the polarizer or for which the projection of the long axis of the dichroic dyes along the X axis of the polarizer has non-zero absorbance, the zones of the defect domains then appearing colored.

If the X axis of the polarizer is turned (first to 0° then to 45% then to) 90°, the zones which appear colored on the PLM images turn, following the rotation of the X axis of the polarizer. This is observed at 0 V or at 25 V. Macroscopically, the lightness L* is modified.

Figure 23:
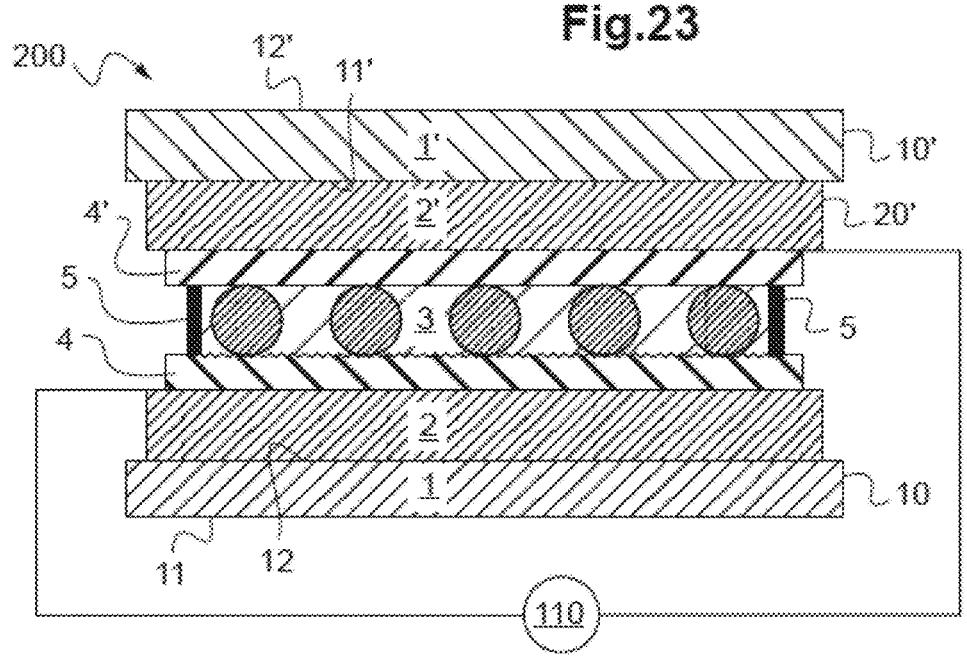

FIG. 23 shows a schematic cross sectional view of a device having variable scattering and coloring by liquid crystals and dichroic dye 200 in a second embodiment of the invention which differs from the first embodiment 100 in that the first PVA planar anchoring layer 4 is brushed with velvet for unidirectional planar anchoring. The line defects are then said to be non-TFCD, or square FCD.

EXAMPLE 3

Figure 24A:
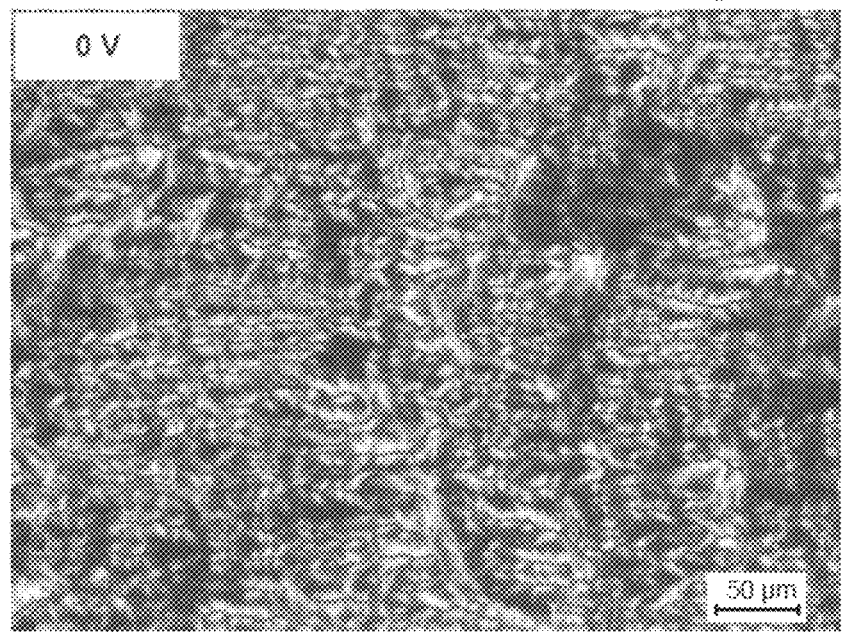
Figure 24B:
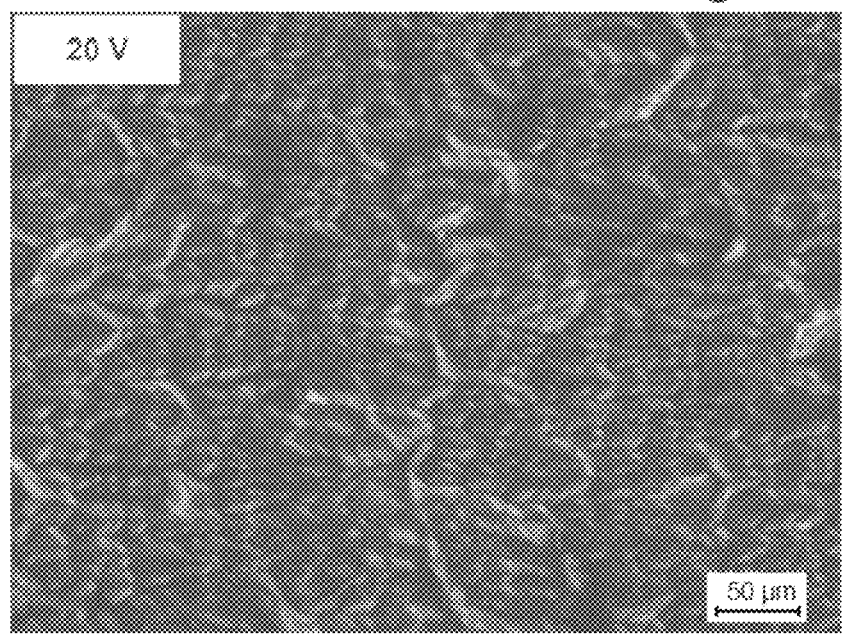
Figure 24C:
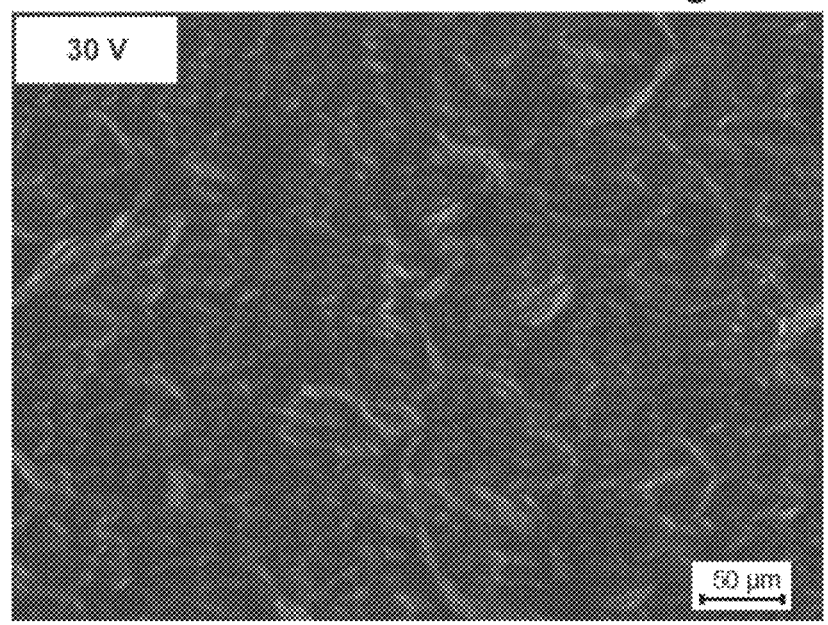
Figure 24D:
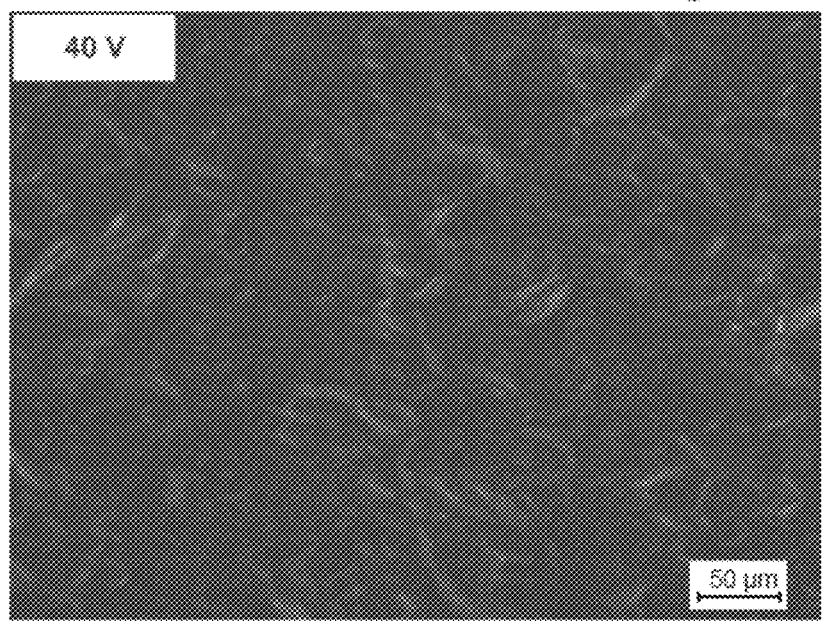
Figure 25:
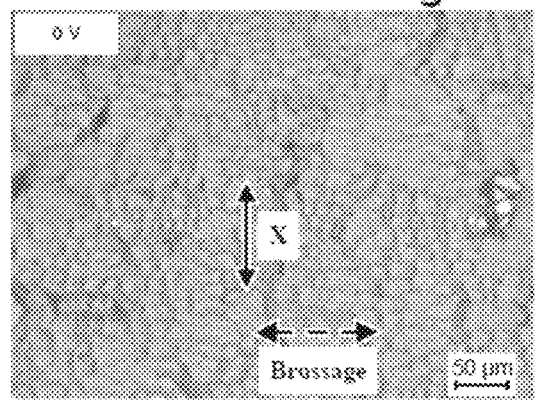

FIGS. 24a, 24b, 24c, 24d show images (in black and white) obtained by polarized light optical microscopy (PLM) between polarizer and analyzer, crossed, under a magnification of 20× (with a 50 μm scale marked in black on a white background) of the domains defined by line defects of the electroactive layer of the electrically controllable device of FIG. 23 in the absence of electric field (FIG. 24a), for an electric field normal to the electroactive layer with a voltage of 20 V (FIG. 24b), 30 V (FIG. 24c), 40 V (FIG. 24d).

The images become increasingly dark between crossed polarizer and analyzer with the increase in voltage, since more and more liquid crystals are oriented parallel to the electric field when the voltage increases, which is to reflected in a decrease in the apparent size of the domains, which have a jersey knit form which appears to shrink.

FIGS. 25 to 29 show images (in black and white) obtained by polarized light optical microscopy (PLM), under polarizer at different orientations and without analyzer under a magnification of 20× (with a 50 µm scale marked in black on a white background), of the domains defined by line defects of the electroactive layer of the electrically controllable device of FIG. 1 (example 3):

in the absence of electric field (FIGS. 25, 26, 27), respectively with X normal, at 45, or parallel to the brushing direction for an electric field normal to the electroactive layer with a voltage of 10 V (28), 40 V (29), with X parallel to the brushing direction.

Figure 26:
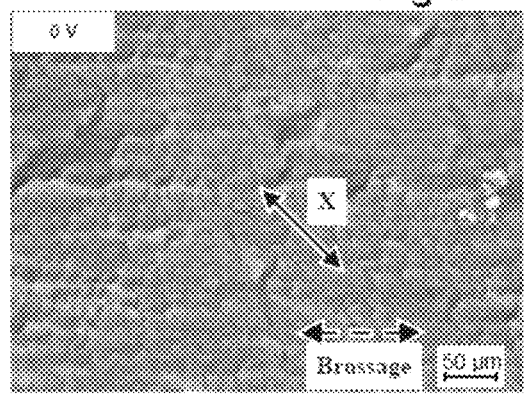
Figure 27:
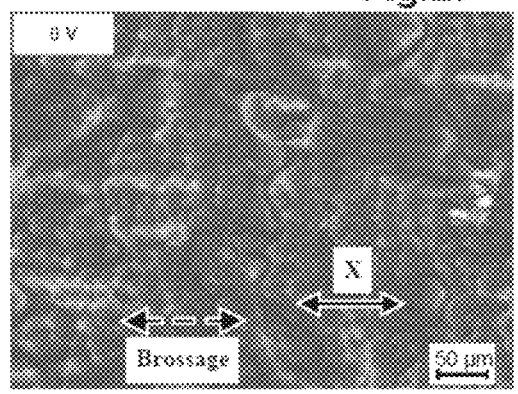

When the defect domains are non-TFCD (implying a unidirectional planar anchoring layer along the brushing axis and a normal anchoring layer as already described), it is observed that, if X is normal to the brushing axis (FIG. 25), then the absorption by the dichroic dye appears to be minimal, then it increases if at 45° (FIG. 26). If X is parallel to the brushing axis (FIG. 27) then the absorption by the dichroic dye appears to be maximal.

Figure 28:
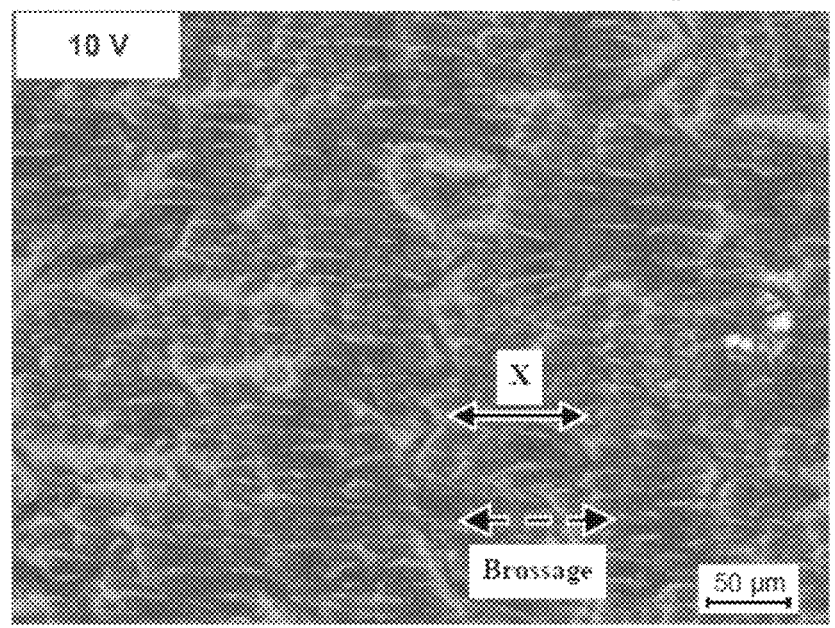
Figure 29:
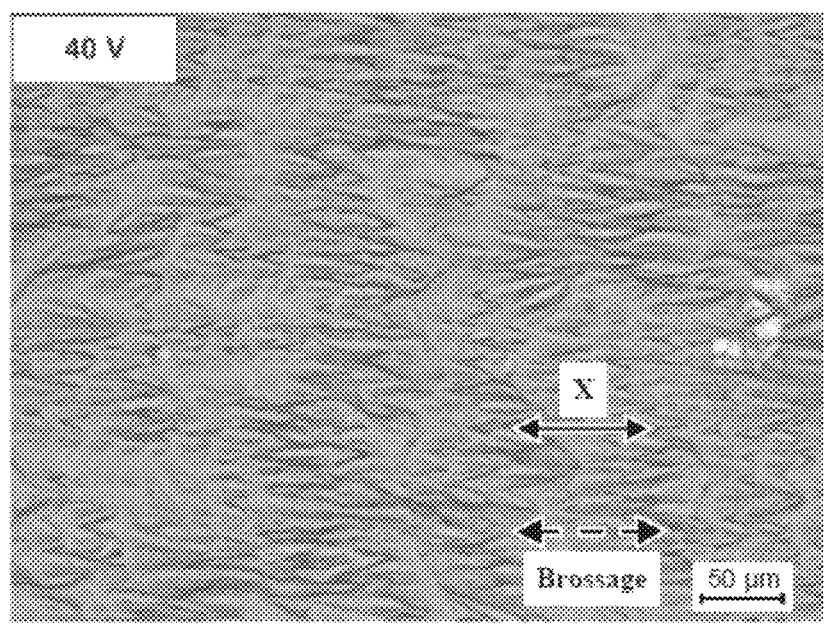

The image of FIG. 29 is lighter than that of FIG. 28 because the liquid crystals are oriented, entraining the dyes, which then absorb less at 40 V than at 10 V.

Figure 30:
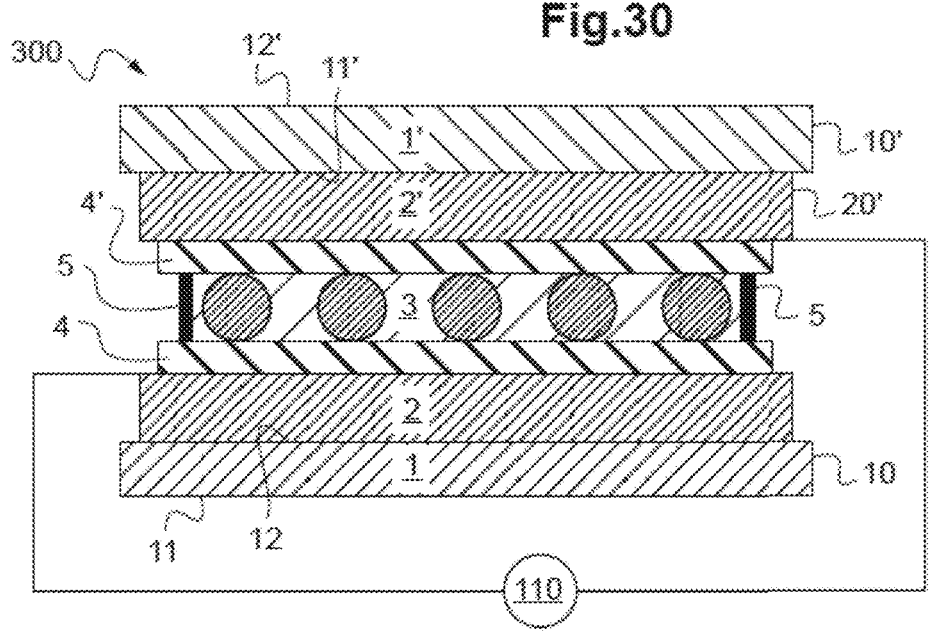
FIG. 30 shows a schematic cross sectional view of a device having variable scattering and coloring by liquid crystals and dichroic dye 300 in a third embodiment of the invention.

FIG. 30 shows a schematic cross sectional view of a device having variable scattering and coloring by liquid crystals and dichroic dye 300 in a third embodiment of the invention which differs from the first embodiment 100 in that the second anchoring layer becomes a planar anchoring layer 4' (degenerate) and herein is identical to the first PVA planar anchoring layer (degenerate).

ASSEMBLY EXAMPLES

Figure 31:
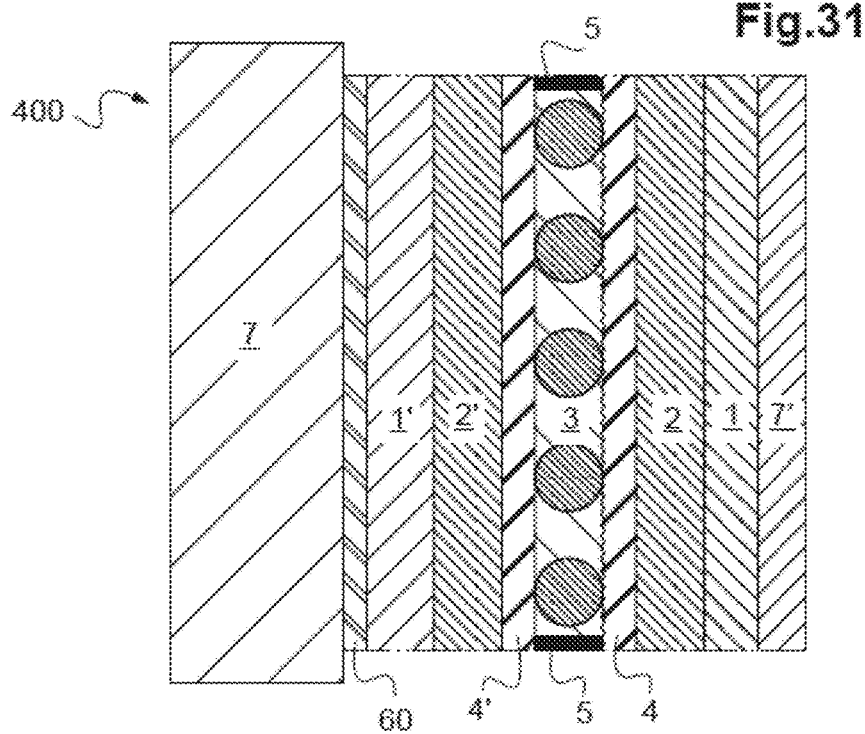
FIG. 31 shows a schematic cross sectional view of a device having variable scattering and color by liquid crystals and dichroic dye 400 in a fourth embodiment of the invention.

FIG. 31 shows a schematic cross sectional view of a device having variable scattering and color by liquid crystals and dichroic dye 400 in a fourth embodiment of the invention which differs from the first embodiment 100 in that:

the glasses 1 and 1' are replaced by PET 1, 1'
and the stack is adhesively bonded with an optical adhesive 60 to an element 7 such as a glass 7 or rigid plastic, for example.

For example, this is a partition (vertical position).

The assembly may form part of a multiple glazing (double or triple glazing).

For a double glazing, the stack may be on the face 1 side (external face), or 2, 3; 4 (internal face) side.

The stack of the device 400 may be flexible and adapt to the curves of the applied element 7.

For a triple glazing, the stack may be on the face 1 side (external face), or 2, 3; 4, 5, 6 (external face) side.

The element 7 may be of the same dimension, or larger, than the stack.

The stack may be:
on the preferably external face of a shower wall,
on the preferably internal face (face 'F4') of a curved vehicle glazing, in particular in a car: roof, side glazing, windscreen, rear window.

In particular, the device 400 may serve as projection screen.

FIG. 31 shows a schematic cross sectional view of a device having variable scattering and color by liquid crystals and dichroic dye 500 in a fifth embodiment of the invention which comprises the first device 100 (glasses 1, 1' optionally replaced by PET films, for example) in a laminated glazing, i.e. in a lamination interlayer 7, for example PVB or EVA which is submillimetric or at most 2 mm between a first and a second glazing 8, 8', for example of generally rectangular shape (or more broadly quadrilateral, polygonal) of identical or similar dimensions, for example of thickness of at most 5 mm or 3 mm with main internal faces 81, 81' on the interlayer side and external faces 82, 82'.

During the manufacture, it is possible to use three interlayer sheets: two solid sheets 71, 72 against the internal faces 81, 81' of the glazings 8, 8', and a central sheet with an opening to house the stack of FIG. 1. After lamination, the interface between leaflets (symbolized by dots) is not necessarily discernible. It is preferred for the opening to be closed rather than entirely opening out on one side. Thus, the whole edge of the stack is surrounded by lamination interlayer 7. Of course, for the power supply, connections can emerge from the device 500 and even protrude beyond one or more side edges of the glazings.

Alternatively, it is possible to use two interlayer sheets 71, 72, the central sheet with a hole not being necessary if the stack is sufficiently thin, for example of a thickness of at most 0.2 mm.

A first glazing 8 or 8' may be colorless or tinted (gray, green, bronze, etc.) and the other glazing may be clear or extra-clear 8' or 8. A first interlayer sheet may be tinted (gray, green, bronze) and the other(s) may be clear or extra-clear. One of the first glazings 8 or 8' may be replaced by a plastic sheet such as a polycarbonate or a PMMA (in particular with a PU lamination interlayer).

The edge 70 of the lamination interlayer may be set back (by at most 5 mm, for example) from the edge 80, 80' of the glazings 8, 8'.

The device 500 covers virtually the whole of the main faces of the glasses 8 and herein is even centered. There is the same width of PVB 7a, 7b, on either side of the device 200.

The glazings 8, 8' are planar or curved, the device 500 being able to adapt to the curve(s) of the glazings.

The device 500 may be a partition or else a vehicle roof. For example, for a vehicle roof:
the glazing 8 is the curved exterior glazing, which is an optionally tinted glazing of 3 mm
the glazing 8' is the curved interior glazing, which is a clear glazing of 3 mm or thinner
the lamination interlayer 8 is made of PVB which can be acoustic, in particular bilayer or trilayer (sheet 71 or 72).

The roof may therefore also be of color which can be varied, for example from dark blue to light blue, with the voltage.

FIGS. 33 and 34 show, respectively, a front view and a schematic cross sectional view of a device having variable scattering and coloring by liquid crystals and dichroic dye 600 in a sixth embodiment of the invention.

The device 600 differs from the device 600 in that the stack of FIG. 1 100 covers a surface portion, in particular a peripheral strip, for example along an upper longitudinal edge H of a motor vehicle windscreen (curved laminated glazing with the device 100), over virtually the whole length of the windscreen.

This strip 100 is in a marginal zone, in which the criteria of $L_T$ and absence of haze are freer than in the central zone ZB.

This strip may therefore also be of color which can be varied, for example from dark blue to light blue, with the voltage.

As shown in FIG. 34 (cross sectional view), the width 7a of central interlayer 73 between the device 200 and the lower longitudinal edge B is larger than the width 7b of central interlayer 73 between the device 600 and the upper longitudinal edge H.

As a variant, or in addition, it may be present along a lower longitudinal edge B of the windscreen, over the whole length or a portion of the length.

As shown in FIG. 33 (front view of interior side of vehicle), the windscreen comprises a first opaque frame, for example made of enamel (black or other) 91' to 94' on the lateral and longitudinal edges of the free face (F4) 82' of the internal glazing 8' and a second opaque frame, for example made of enamel (black or other) 91 to 94 on the lateral and longitudinal edges of the free face (F1) 82 of the external glazing 8.

The edge face of the device 600 which is on the side of the lower longitudinal edge, and even those on the side of the lateral edges, can be (facing) between the layers 92, 92', 93, 93', 94, 94' of the enamel frames. For example, the connections and other current-supplying strips can also be masked by these layers 92, 92', 93, 93', 94, 94'.

FIG. 35 shows a schematic cross sectional view of a device having variable scattering and coloring by liquid crystals and dichroic dye 700 in a seventh embodiment of the invention which differs from the last embodiment 600 in that this is a motor vehicle roof, for example with the external glass 8 which is tinted and/or the PVB 71 which is tinted and the device 100 which substantially covers the whole main face of the glasses 8, 8'.

The invention claimed is:

1. An electrically controllable device having variable scattering by liquid crystals, comprising a stack of layers in this order:
    a first electrode with a first main surface forming a connecting surface and an opposite surface;
    a dielectric electroactive layer with a first main face oriented toward the connecting surface and a second main face opposite the first main face, the dielectric electroactive layer made of a material comprising:
        liquid crystals,
        polymers forming a polymeric network, the liquid crystals being stabilized by the polymeric network,
    a second electrode with a second connecting surface oriented toward the second main face and with an opposite surface;
    the dielectric electroactive layer being visible by transparency on a side of the first electrode and/or a side of the second electrode,
    wherein the material exhibits, from a temperature T1, a mesophase P, wherein the material comprises a set of domains which comprise two-dimensional topological defects,
    wherein, at a temperature T' greater than or equal to T1, the stack is capable of exhibiting at least first, second and third states in a working range which comprises all or part of the visible range,
    the first state being a first scattering state and being the most scattering among the first, second and third states,
    the second scattering state being a second scattering state and less scattering than the first scattering state,
    and the third state being transparent or scattering and less scattering than the second scattering state,
    the first, second and third states being switchable and reversible,
    at least two of the first, second and third states being obtained by applying an electric field between the first and second electrodes,
    and wherein the material comprises at least one dichroic dye having an absorption wavelength, or an absorption band, within the working range, and wherein the first scattering state is colored with a color C0 defined by a lightness L*0, the second less scattering state exhibits a color C1 separate from C0, defined by a lightness L*1 separate from L*0.

2. The electrically controllable device having variable scattering by liquid crystals according to claim 1, wherein the first scattering state is accessible in the absence of said applied electric field, the second and third states are accessible in the presence of said applied electric field, the second scattering state being obtained for a voltage V1 and the third state being obtained for a voltage V2 greater than V1, and wherein L*1 is greater than L*0, and the third state, which is the least scattering of the first, second and third states, also exhibits a color C2 separate from C1 and C0 defined by a lightness L*2 separate from L1* and L*0.

3. The electrically controllable device having variable scattering by liquid crystals according to claim 1, wherein said electric field is alternating and, at T', the stack exhibits a diffuse transmission DT and/or a haze H which decreases with the voltage at least to a voltage threshold value and a color with a lightness L* which decreases or increases with the voltage at least to said voltage threshold value.

4. The electrically controllable device having variable scattering by liquid crystals according to claim 1, wherein the stack exhibits:
    a relative difference in % between H0 and Hv which is, in absolute value, at least 30%, where Hv is the haze value under electric field and H0 is the haze value without electric field,
    and/or a relative difference in % between LT0 and LTv is at least 5%, where LTv is the light transmission value under electric field and LTv is the light transmission value without electric field,
    and/or a relative difference in % between LA0 and LAv which is, in absolute value, at least 5%, where LAv is the absorption value under electric field and LA0 is the absorption value without electric field.

5. The electrically controllable device having variable scattering by liquid crystals according to claim 1, further comprising at least one linear polarizer with a polarization axis in a plane parallel to the first main face of the dielectric electroactive layer.

6. The electrically controllable device having variable scattering by liquid crystals according to claim 1, wherein the mesophase P is not smectic.

7. The electrically controllable device having variable scattering by liquid crystals according to claim 1, wherein the material exhibits another mesophase P' at a temperature less than Ti, and wherein the mesophase P is further from the crystalline phase than the mesophase P'.

8. The electrically controllable device having variable scattering by liquid crystals according to claim 1, wherein said domains of the mesophase P are domains remaining from another mesophase P'.

9. The electrically controllable device having variable scattering by liquid crystals according to claim 1, wherein said domains of the mesophase P are domains remaining from another mesophase P', and the phase P' is not nematic.

10. The electrically controllable device having variable scattering by liquid crystals according to claim 1, wherein said domains of the mesophase P are domains remaining from another mesophase P' and the phase P is nematic.

11. The electrically controllable device having variable scattering by liquid crystals according to claim 1, wherein the domains are comparable to focal conic domains of smectic phases.

12. The electrically controllable device having variable scattering by liquid crystals according to claim 1, further comprising:
in contact with the first main face of the dielectric electroactive layer, a first liquid crystal surface anchoring layer, able to anchor at least a fraction of the liquid crystals in contact with said first liquid crystal surface anchoring layer in a first orientation in the absence of said applied electric field,
in contact with the face of the dielectric electroactive layer, a second surface anchoring layer able to orient a fraction of the liquid crystals in contact with the second surface anchoring layer in a second orientation, in the absence of said applied electric field.

13. The electrically controllable device having variable scattering by liquid crystals according to claim 12, wherein:
the first liquid crystal surface anchoring layer is is a unidirectional or degenerate planar anchoring and the second surface anchoring layer is a normal or degenerate planar anchoring,
or the first liquid crystal surface anchoring layer is a dielectric layer and/or the second surface anchoring layer is a dielectric layer.

14. The electrically controllable device having variable scattering by liquid crystals according to claim 1, wherein the first electrode is on a dielectric substrate, wherein the dielectric substrate is transparent on a side of the opposite surface of the first electrode and bears the first electrode, and the dielectric substrate is transparent and selected from a glass sheet or a transparent polymeric sheet with an optional scratch-resistant layer.

15. The electrically controllable device having variable scattering by liquid crystals according to claim 1, wherein the first electrode is on a dielectric substrate, wherein the dielectric substrate is transparent on a side of the opposite surface of the first electrode and bears the first electrode which is transparent and comprises a first glass sheet which, on the side of the opposite surface of the first electrode, is laminated via a thermoplastic lamination interlayer to another glass sheet.

16. The electrically controllable device having variable scattering by liquid crystals according to claim 1, comprising a laminated glazing comprising:
a first additional glass sheet,
a thermoplastic lamination interlayer,
a second additional glass sheet or a plastic sheet,
wherein main internal faces of the first and second additional glass sheets face one another, the stack being between the main internal faces.

17. A method for manufacturing an electrically controllable device having variable scattering by liquid crystals, according to claim 1, and comprising:
providing the first electrode and the second electrode,
providing a mixture comprising:
at least one polymer precursor,
liquid crystals, including at least first liquid crystals exhibiting a mesophase P and optionally at least second liquid crystals,
a dichroic dye,
optionally a polymerization initiator
TA being the transition temperature between mesophase P and mesophase P' of the mixture, the mixture exhibiting the mesophase P' below TA and the mesophase P starting from TA,
forming a stack of layers comprising between the first and second electrodes, forming, from said mixture, an electroactive layer made of a material comprising said liquid crystals stabilized by a polymeric network and the dichroic dye, said forming comprising, at the temperature Ti less than TA, a polymerization of said precursor(s), leading to said polymeric network.

18. The method for manufacturing an electrically controllable device having variable scattering by liquid crystals according to claim 17, wherein the first liquid crystals exhibit the mesophase P' below the temperature TA, the first liquid crystals having a transition temperature Tp between the mesophase P and the mesophase P'.

19. The method for manufacturing the electrically controllable device having variable scattering according to claim 17, wherein said forming of the electroactive layer comprises bringing said mixture into contact with first and second liquid crystal surface anchoring layers.

20. The method for manufacturing the electrically controllable device having variable scattering according to claim 17, further comprising laminating said stack between two glass sheets by means of a polymeric lamination interlayer, which lamination interlayer comprises one or more sheets.

* * * * *

UNITED STATES PATENT AND TRADEMARK OFFICE
CERTIFICATE OF CORRECTION

| | |
|---|---|
| PATENT NO. | : 12,001,111 B2 |
| APPLICATION NO. | : 17/916449 |
| DATED | : June 4, 2024 |
| INVENTOR(S) | : Frédéric Mondiot |

It is certified that error appears in the above-identified patent and that said Letters Patent is hereby corrected as shown below:

On the Title Page

Item (56) References Cited: OTHER PUBLICATIONS should read as follows:
Goodby, J. W., et al., "What makes a liquid crystal? The effect of free volume on soft matter," Liquid Crystals, June 2015, 32, pages.

Signed and Sealed this
First Day of October, 2024

Katherine Kelly Vidal
*Director of the United States Patent and Trademark Office*